(12) United States Patent
Dhanabalan et al.

(10) Patent No.: US 11,792,174 B2
(45) Date of Patent: *Oct. 17, 2023

(54) METHOD TO SAVE COMPUTATIONAL RESOURCES BY DETECTING ENCRYPTED PAYLOAD

(71) Applicant: Citrix Systems, Inc., Fort Lauderdale, FL (US)

(72) Inventors: Praveen Raja Dhanabalan, Bengaluru (IN); Surya Prakash Patel, Bengaluru (IN); J Mohan Rao Arisankala, Bengaluru (IN)

( * ) Notice: Subject to any disclaimer, the term of this patent is extended or adjusted under 35 U.S.C. 154(b) by 62 days.

This patent is subject to a terminal disclaimer.

(21) Appl. No.: 17/322,501

(22) Filed: May 17, 2021

(65) Prior Publication Data

US 2021/0273927 A1 Sep. 2, 2021

Related U.S. Application Data

(63) Continuation of application No. 16/210,793, filed on Dec. 5, 2018, now Pat. No. 11,012,429.

(51) Int. Cl.
| | |
|---|---|
| *H04L 29/06* | (2006.01) |
| *H04L 9/06* | (2006.01) |
| *H04L 12/46* | (2006.01) |
| *H04L 9/40* | (2022.01) |
| *H04L 69/22* | (2022.01) |

(52) U.S. Cl.
CPC ........ *H04L 63/0478* (2013.01); *H04L 9/0643* (2013.01); *H04L 12/4633* (2013.01); *H04L 63/029* (2013.01); *H04L 69/22* (2013.01)

(58) Field of Classification Search
CPC ... H04L 63/0478; H04L 9/0643; H04L 69/22; H04L 63/029; H04L 12/4633; H04L 63/164; H04L 63/168; H04L 63/0272
See application file for complete search history.

(56) References Cited

U.S. PATENT DOCUMENTS

| | | |
|---|---|---|
| 6,965,992 B1 | 11/2005 | Joseph et al. |
| 9,130,992 B2 | 9/2015 | Hsu et al. |

(Continued)

OTHER PUBLICATIONS

"GRE Tunneling over IPSec"—Cisco Systems, Nov. 2006 https://ptgmedia.pearsoncmg.com/images/9781587201509/samplechapter/158720150X_CH14.pdf (Year: 2006).*

(Continued)

*Primary Examiner* — Randy A Scott

(57) ABSTRACT

Described embodiments provide systems and methods for remapping connections to tunnels selected based on a security level of the communications. A first network device may be in communication with a second network device via a plurality of communication tunnels. The plurality of communication tunnels may include an encrypted communication tunnel and an unencrypted communication tunnel. The first network device may receive a packet, the packet including header information and a payload. The first network device may determine whether the received packet is encrypted to meet a threshold level of security. The first network device may, responsive to determining that the packet is to meet the threshold level of security, communicate an identifier of the payload and the header information to the second network device via the encrypted communication tunnel, and communicate the payload to the second network device via the unencrypted communication tunnel.

20 Claims, 11 Drawing Sheets

(56) References Cited

U.S. PATENT DOCUMENTS

| | | | |
|---|---|---|---|
| 9,461,875 B2* | 10/2016 | Groat | H04L 61/5092 |
| 2013/0212249 A1 | 8/2013 | Groat et al. | |
| 2014/0019751 A1 | 1/2014 | Hsu et al. | |
| 2016/0315920 A1* | 10/2016 | Kurmala | H04L 63/0471 |
| 2017/0346854 A1 | 11/2017 | Kumar et al. | |
| 2018/0337889 A1* | 11/2018 | Panchapakesan | H04L 9/14 |

OTHER PUBLICATIONS

"Tunnel Comparison Between Generic Routing Encapsulation (GRE) and IP Security (IPSec)"—Akinola Azeez Paul & Chong Zhang, School of Information Science, Computer and Electrical Engineering—Halmstad University, Mar. 27, 2012 https://www.diva-portal.org/smash/get/diva2:525279/FULLTEXT01.pdf (Year: 2012).*

"GRE Tunneling over IPSec"—Cisco Systems, Nov. 2006 https://www.cisco.com/c/en/us/td/docs/solutions/Enterprise/WAN_and_MAN /P2P_GRE_IPSec/P2P_GRE.pdf (Year: 2006).

European Search Report on EP Appl. No. 19211259.7, dated Apr. 21, 2020.

Extended European Search Report for EP Appl. No. 19211259.7, dated Apr. 21, 2020.

Non-Final Office Action on U.S. Appl. No. 16/210,793 dated Jun. 18, 2020.

Non-Final Office Action on U.S. Appl. No. 16/210,793 dated Oct. 22, 2020.

Notice of Allowance on U.S. Appl. No. 16/210,793 dated Jan. 21, 2021.

\* cited by examiner

METHOD TO SAVE COMPUTATIONAL RESOURCES BY DETECTING ENCRYPTED PAYLOAD

CROSS-REFERENCE TO RELATED APPLICATION

This application is a continuation of, and claims priority to and the benefit of, U.S. patent application Ser. No. 16/210,793, titled "METHOD TO SAVE COMPUTATIONAL RESOURCES BY DETECTING ENCRYPTED PAYLOAD," and filed on Dec. 5, 2018, the contents of all of which are hereby incorporated herein by reference in its entirety for all purposes.

FIELD OF THE DISCLOSURE

The present application generally relates to communicating network packets, including but not limited to systems and methods for selecting communications tunnels for various traffic.

BACKGROUND

Packets may be encrypted by a sender node using various cryptographic algorithms prior to transmission over a network. In addition, a communication channel within the network may apply a separate encryption to the packets when communicated over the communication channel.

BRIEF SUMMARY

This summary is provided to introduce a selection of concepts in a simplified form that are further described below in the Detailed Description. This summary is not intended to identify key features or essential features, nor is it intended to limit the scope of the claims included herewith.

A network device may use communication channels or tunnels to communicate packets through a network. For example, intermediary devices (e.g., middle box devices) deployed between network nodes distributed across multiple sites may use site-to-site tunnels to communicate the packets through a software-defined wide-area network (SD-WAN). The tunnels may encrypt all network traffic communicated through the network among the nodes. The network traffic may include web traffic, application-specific traffic and (middle box) device-specific traffic. The traffic may include packets with encrypted or unencrypted payload data. As most of the network traffic can correspond to application-specific traffic and web traffic that are already encrypted, a majority of the network traffic sent over encrypted tunnels may already be encrypted, and may be encrypted again via the encrypted tunnels. Conversely, (middle box) device-specific traffic may include packets with unencrypted data. As such, a smaller portion of the network traffic sent over the encrypted tunnel (e.g., site-to-site encrypted tunnel) may be singly encrypted (or encrypted once) by the tunnel.

Performance-related issues may arise from treating all network traffic in the same or similar manner by encrypting all the packets communicated over the network regardless of type. As the payload data in application-specific traffic is already encrypted, using one of the encrypted tunnels may involve or result in double encryption and double decryption at the sender and recipient nodes respectively. The redundancy in encryption and decryption may incur increased computing resources, such as processing, memory, and energy, at both the sender and recipient nodes. The consumption of computing resources in encrypting and decrypting may also lead to a greater expenditure of time in accessing and processing the contents of the packets. These effects may be particularly exacerbated in application-specific traffic to which cryptographic algorithms are doubly applied (e.g., once by an application providing the traffic, and once by an intermediary device directing the traffic through an encrypted tunnel). What is more, the double encryption and decryption may be performed by the network nodes without any additional improvements to data security or integrity in communications, relative to single encryption and decryption.

To reduce the consumption of computing resources and to increase efficiency in processing the packets, the present systems and methods may avoid the redundancy in encryption and decryption of the contents. To that end, the network devices of the network may identify communications already encrypted using secure ciphers and may re-route the network traffic through one or more of the tunnels accordingly. The tunnels established by the nodes of the network may be of various levels of encryption for different types of traffic. In general, the network devices may establish a tunnel of a lower encryption level for pre-encrypted or sufficiently encrypted network traffic, relative to an encryption level of a tunnel for insufficiently encrypted traffic. For example, the tunnels may include: an encrypted tunnel (T1) for sending unencrypted or insufficiently encrypted traffic; an unencrypted tunnel (T2) for sending already (or sufficiently) encrypted payload data; and/or an encrypted tunnel (T3) for sending metadata of the already (or sufficiently) encrypted payload data, among others. The network device may select which of the tunnels to send the communications based on a level of security. The levels of security may include: unknown, corresponding to a connection that is not yet identified as encrypted or unencrypted; secure, corresponding to a connection that is encrypted with at least a threshold strength; and unsecure, corresponding to a connection that is unencrypted or encrypted with less than the threshold strength, among others.

In sending the packet through the network, the sender network device may identify the level of security from the packet. If the packet is identified as of an unknown connection, the network device may send the packet through the encrypted tunnel (e.g., T1). Otherwise, if the packet is not identified as of an unknown connection, the network device may identify the encryption strength of the packet, and compare the encryption strength to the threshold strength. If encryption strength is determined to be less than the threshold strength, the network device may identify the packet as of the unsecured connection. The network device may also send the packet over the encrypted tunnel (e.g., T1). Conversely, if the encryption strength is determined to be greater than or equal to the threshold strength (or threshold level of security), the network device may identify the packet as of the secured connection. The network device may further extract the metadata (e.g., a network layer header and/or a transport layer header) and the payload data from the packet. Using the payload data, the network device may generate a packet digest. The network device may send the metadata over the encrypted tunnel (T3) for metadata along with the packet digest, which are thus singly encrypted. As the payload data is already encrypted, the network device may also send the payload data over the unencrypted tunnel (e.g., T2).

Upon receipt of the packet from the network, the recipient network device may identify through which tunnel the packet was sent. When the packet is sent through the encrypted tunnel (e.g., T1), the network device may process the packet by decrypting the entirety of the packet. When the packets are sent through the unencrypted tunnel (e.g., T2) for payload data and the encrypted tunnel (e.g., T3) for metadata, the network device may gather and combine the payload data with the corresponding metadata. The network device may identify which packet containing the payload data corresponds with the packet containing the metadata using the packet digest. Based on the identification, the network device may combine the payload data with the metadata to recover the original packet. In this manner, the sender and recipient network devices of the present systems and methods may avoid redundancy in doubly encrypting and decrypting the network communications. The avoidance of redundant encryption and decryption may also reduce consumption of computing resources as well as expenditure of time in processing the packets, while maintaining an adequate level of security.

In one aspect, this disclosure is directed to a system. The system may include a first network device in communication with a second network device via a plurality of communication tunnels. The plurality of communication tunnels may include an encrypted communication tunnel and an unencrypted communication tunnel. The first network device may receive a packet, the packet including header information and a payload. The first network device may determine whether the received packet is encrypted to meet a threshold level of security. The first network device may, responsive to determining that the packet is to meet the threshold level of security, communicate an identifier of the payload and the header information to the second network device via the encrypted communication tunnel, and communicate the payload to the second network device via the unencrypted communication tunnel.

In some embodiments, the first network device may, responsive to determining that the received packet is not to be encrypted to meet the threshold level of security, communicate the packet to the second network device via at least one of: the encrypted communication tunnel or an additional encrypted communication tunnel of the plurality of communication tunnels. In some embodiments, the header information may include at least one of: transport layer header information or network layer header information.

In some embodiments, the identifier of the payload may include a digest of the payload, and the threshold level of security may include at least one of a specified type of encryption or a threshold level of encryption. In some embodiments, the first network device may generate the digest of the packet using a secure hash algorithm (SHA) based scheme to generate a hash of a transport layer payload of the packet, responsive to determining that the received packet is to be encrypted to meet the threshold level of security.

In some embodiments, the first network device may, responsive to determining that the packet is to meet the threshold level of security, store connection information of one or more connections of the first network device. The connection information may include a connection tuple and session information of a connection associated with the received packet. In some embodiments, In some embodiments, the received packet is a first packet. In some embodiments, the first network device may determine whether a second packet received at the first network device has information that matches the connection information stored in a database of the first network device and associated with the first packet. In some embodiments, the first network device may, responsive to determining that the second packet has information that matches the connection information associated with the first packet, communicate an identifier of a payload of the second packet and header information of the second packet via the encrypted communication tunnel, and communicate the payload of the second packet via the unencrypted communication tunnel.

In some embodiments, the first network device may identify a communication protocol of the packet. In some embodiments, the first network device may determine the threshold level of security according to the identified communication protocol. In some embodiments, the second network device may receive the identifier and the header information of the packet via the encrypted communication tunnel, and the payload of the packet via the unencrypted communication tunnel. In some embodiments, the second network device may associate the header information received via the encrypted communication tunnel to the payload received via the unencrypted communication tunnel, using the identifier received via the encrypted communication tunnel, to recover the packet.

In another aspect, this disclosure is directed to a method. A first network device may establish a plurality of communication tunnels with a second network device. The plurality of communication tunnels may include an encrypted communication tunnel and an unencrypted communication tunnel. The first network device may receive a packet that includes header information and a payload. The first network device may determine whether the received packet is encrypted to meet a threshold level of security. Responsive to determining that the packet is to meet the threshold level of security, the first network device may communicate an identifier of the payload and the header information to the second network device via the encrypted communication tunnel. The first network device may communicate the payload to the second network device via the unencrypted communication tunnel. The first network device may cause at the second network device, the header information communicated via the encrypted communication tunnel, to be combined with the payload communicated via the unencrypted communication tunnel.

In some embodiments, the first network device may communicate, responsive to determining the received packet is not to be encrypted to meet the threshold level of security, the packet to the second network device via an additional encrypted communication tunnel of the plurality of communication tunnels. In some embodiments, the header information may include at least one of: transport layer header information or network layer header information. In some embodiments, the identifier of the payload may include a digest of the payload, and the threshold level of security may include at least one of a specified type of encryption or a threshold level of encryption.

In some embodiments, the first network device may generate the digest of the packet using a secure hash algorithm (SHA) based scheme to generate a hash of a transport layer payload of the packet, responsive to determining that the received packet is to be encrypted to meet the threshold level of security. In some embodiments, the first network device may, responsive to determining that the packet is to be encrypted to meet the threshold level of security, store connection information of one or more connections of the first network device. The connection information may include a connection tuple and session information of a connection associated with the received packet.

In some embodiments, received packet is a first packet. In some embodiments, the first network device may determine whether a second packet received at the first network device has information that matches the connection information stored in a database of the first network device and associated with the first packet. In some embodiments, responsive to determining that the second packet has information that matches the connection information associated with the first packet, the first network device may communicate an identifier of a payload of the second packet and header information of the second packet via the encrypted communication tunnel. The first network device may also communicate a payload of the second packet via the unencrypted communication tunnel.

In some embodiments, the first network device may identify a communication protocol of the packet. In some embodiments, the first network device may determine the threshold level of security according to the identified communication protocol. In some embodiments, the second network device may receive the identifier and the header information of the packet via the encrypted communication tunnel, and the payload of the packet via the unencrypted communication tunnel. In some embodiments, the second network device may associate the header information received via the encrypted communication tunnel to the payload received via the unencrypted communication tunnel, using the identifier received via the encrypted communication tunnel, to recover the packet.

Another aspect provides a non-transitory computer readable medium storing program instructions. The program instructions may cause one or more processors to establish, at a first network device, a plurality of communication tunnels with a second network device. The plurality of communication tunnels may include an encrypted communication tunnel and an unencrypted communication tunnel. The program instructions may cause the one or more processors to receive, at the first network device, a packet that includes header information and a payload. The program instructions may cause the one or more processors to determine, at the first network device, whether the received packet is encrypted to meet a threshold level of security. The program instructions may cause the one or more processors to, responsive to determining that the packet is to be encrypted to meet the threshold level of security, communicate, the first network device, an identifier of the payload and the header information to the second network device via the encrypted communication tunnel. The program instructions may cause the one or more processors to communicate, at the first network device, the payload to the second network device via the unencrypted communication tunnel.

In some embodiments, the program instructions may cause the one or more processors to, responsive to determining the received packet is not to be encrypted to meet the threshold level of security, encrypt, at the first network device, the packet. In some embodiments, the program instructions may cause the one or more processors to communicate, at the first network device, the encrypted packet to the second network device via an additional encrypted communication tunnel of the plurality of communication tunnels.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 5A:
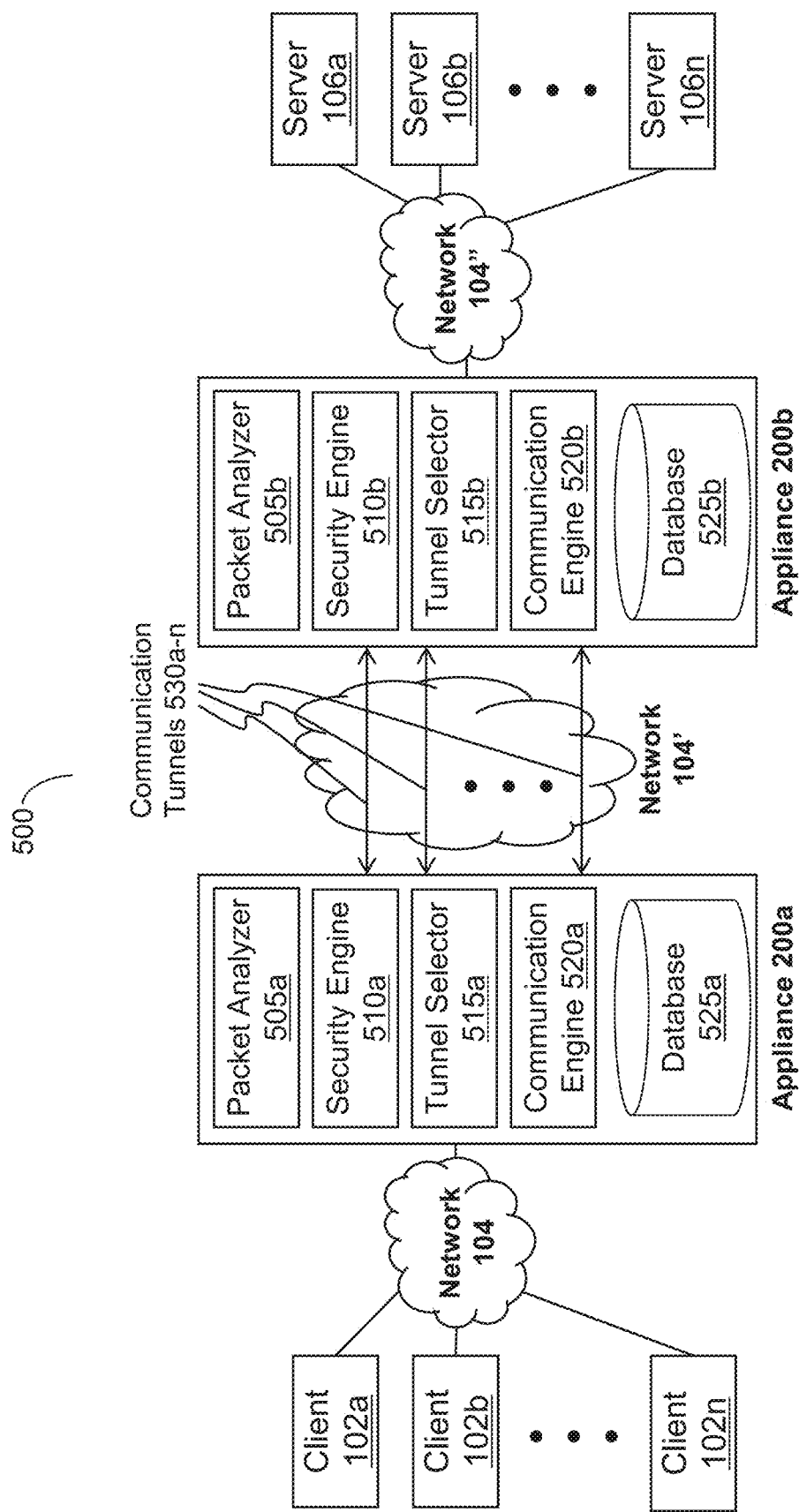
FIG. 5A is a block diagram of an embodiment of a system for using tunnels based on a security level of the communications.
Figure 5B:
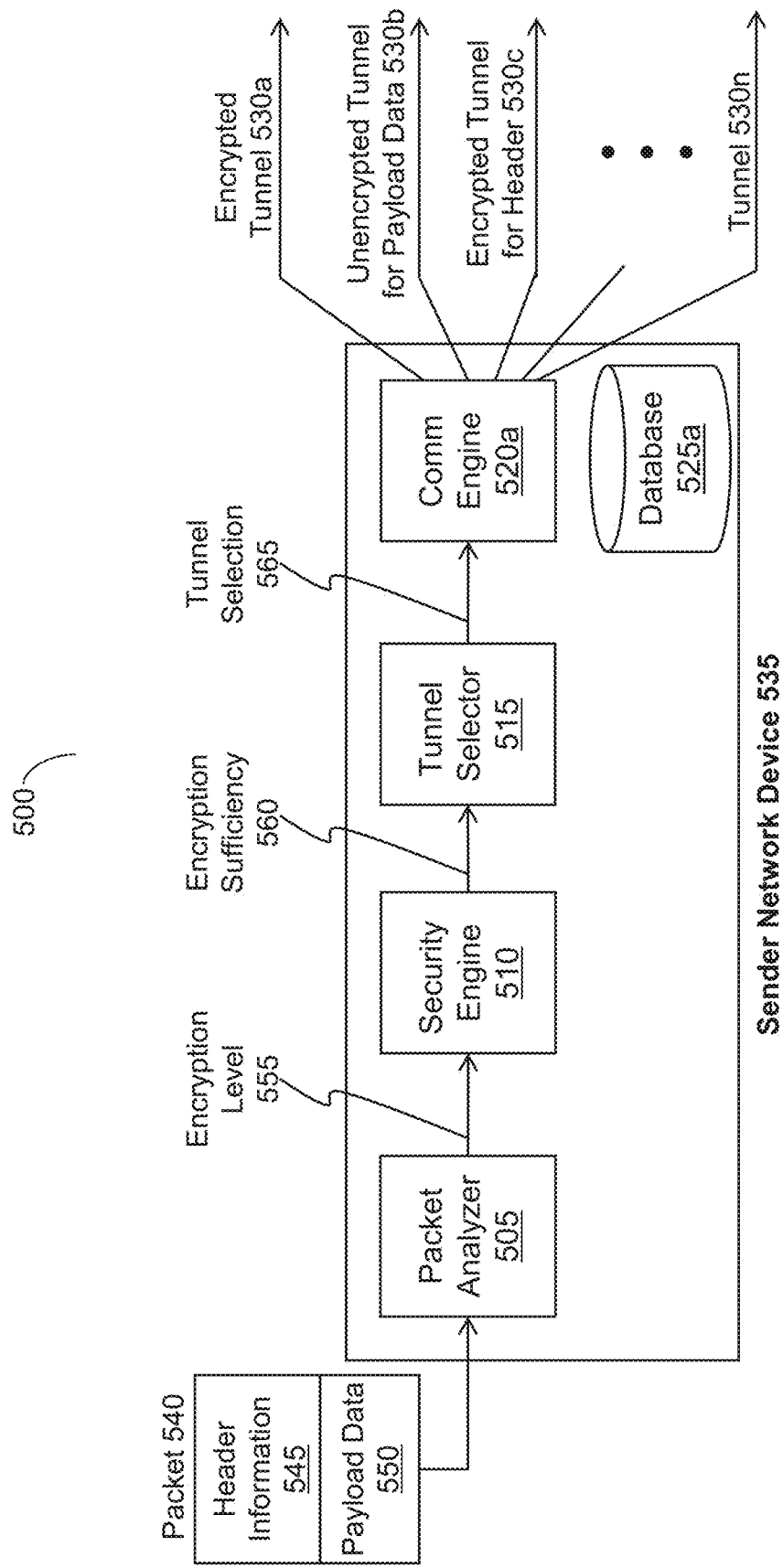
Figure 5C:
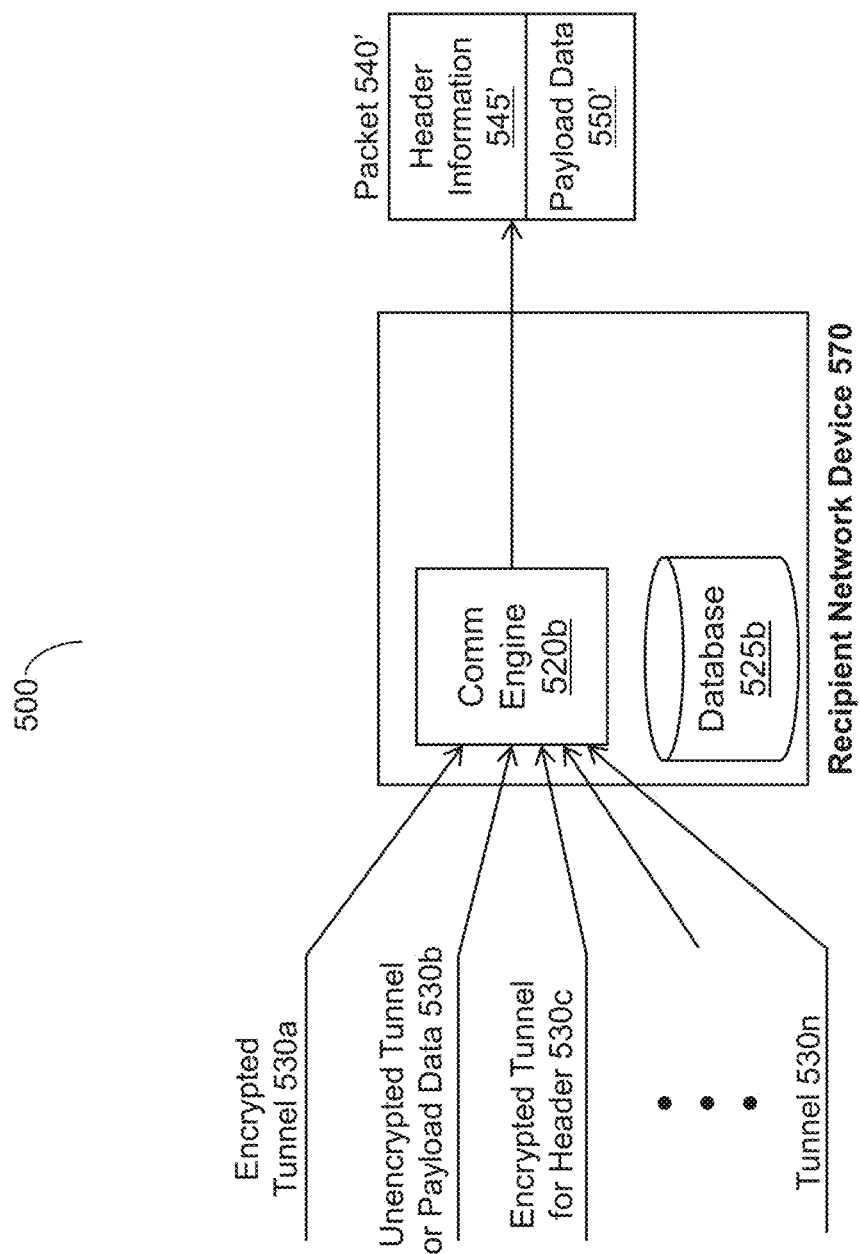
Figure 6A:
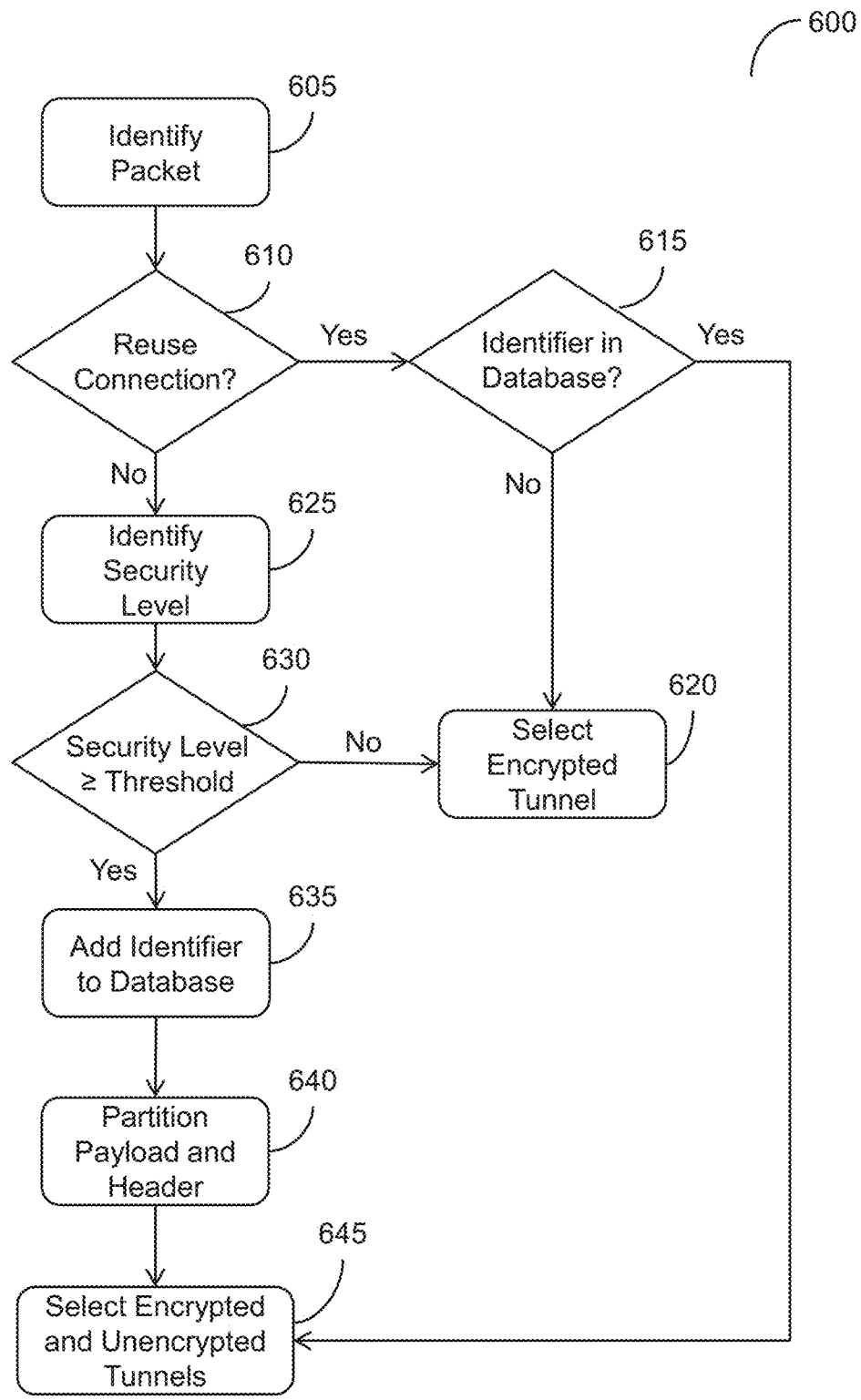
Figure 6B:
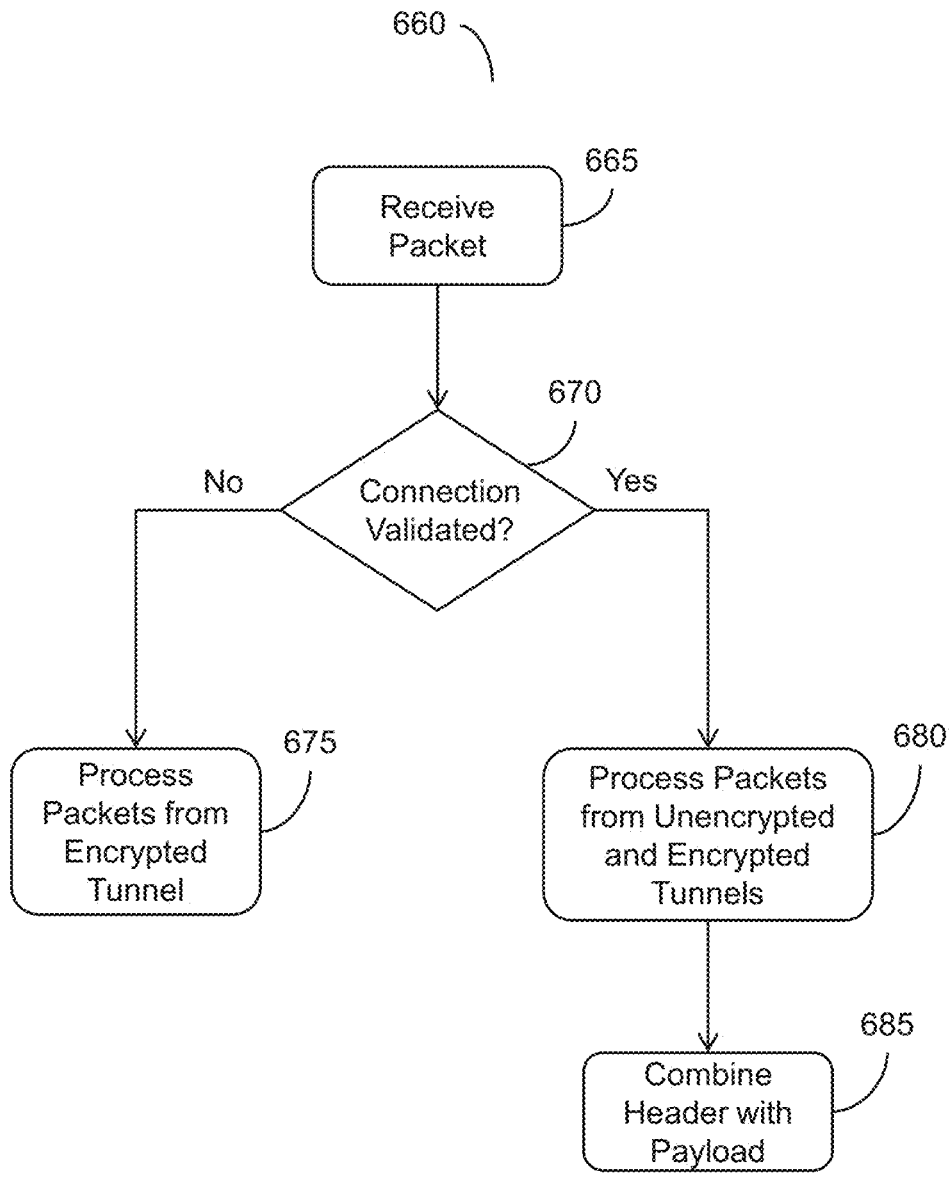

FIGS. 5B and 5C each is a communication diagram of an appliance in a system for using tunnels based on a security level of the communications; and FIGS. 6A and 6B each is a flow diagram of an embodiment of a method of using tunnels based on a security level of the communications.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for using tunnels based on a security level of the communications.

A. Network and Computing Environment

Figure 1A:
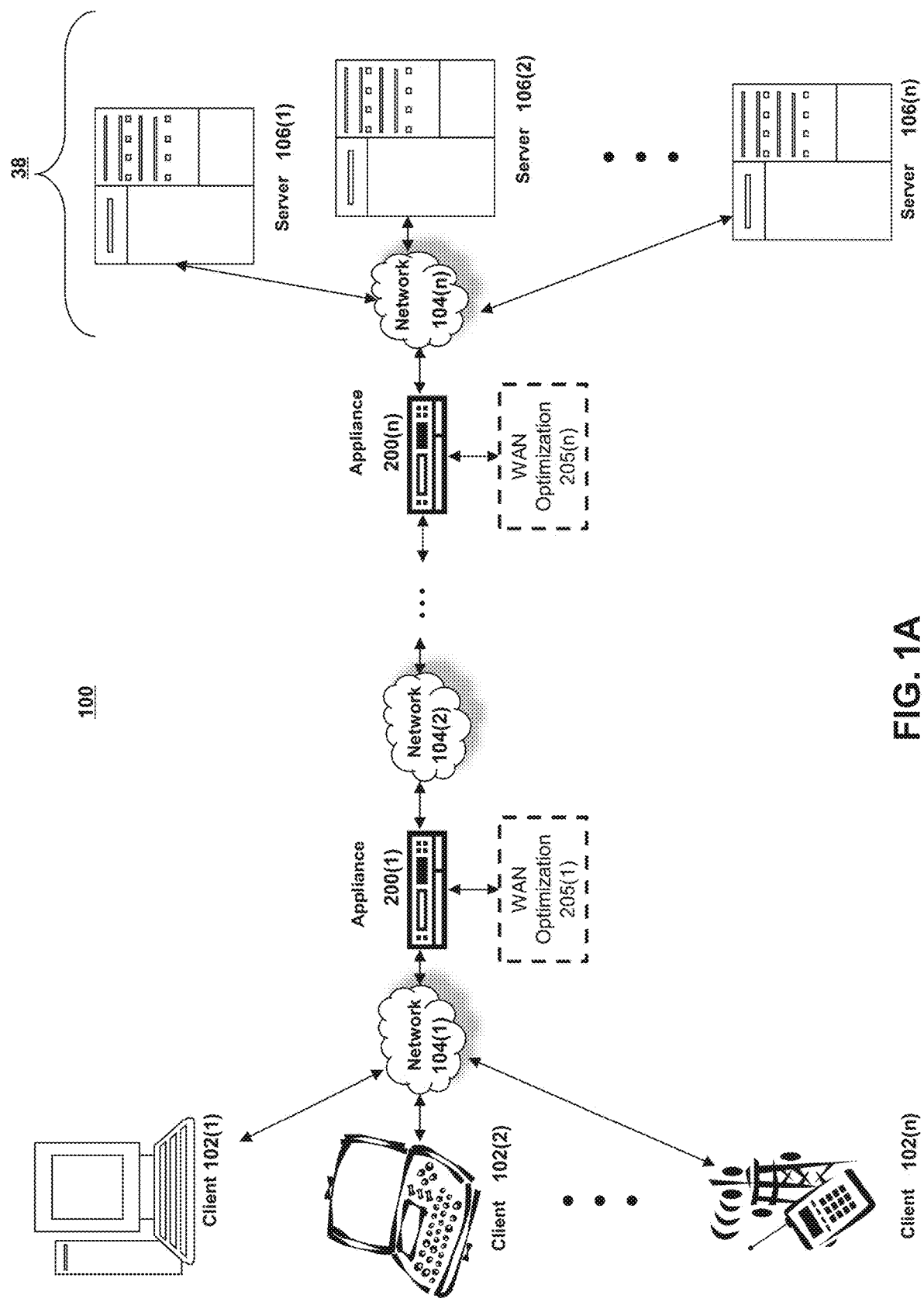
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, Fla.

Figure 1B:
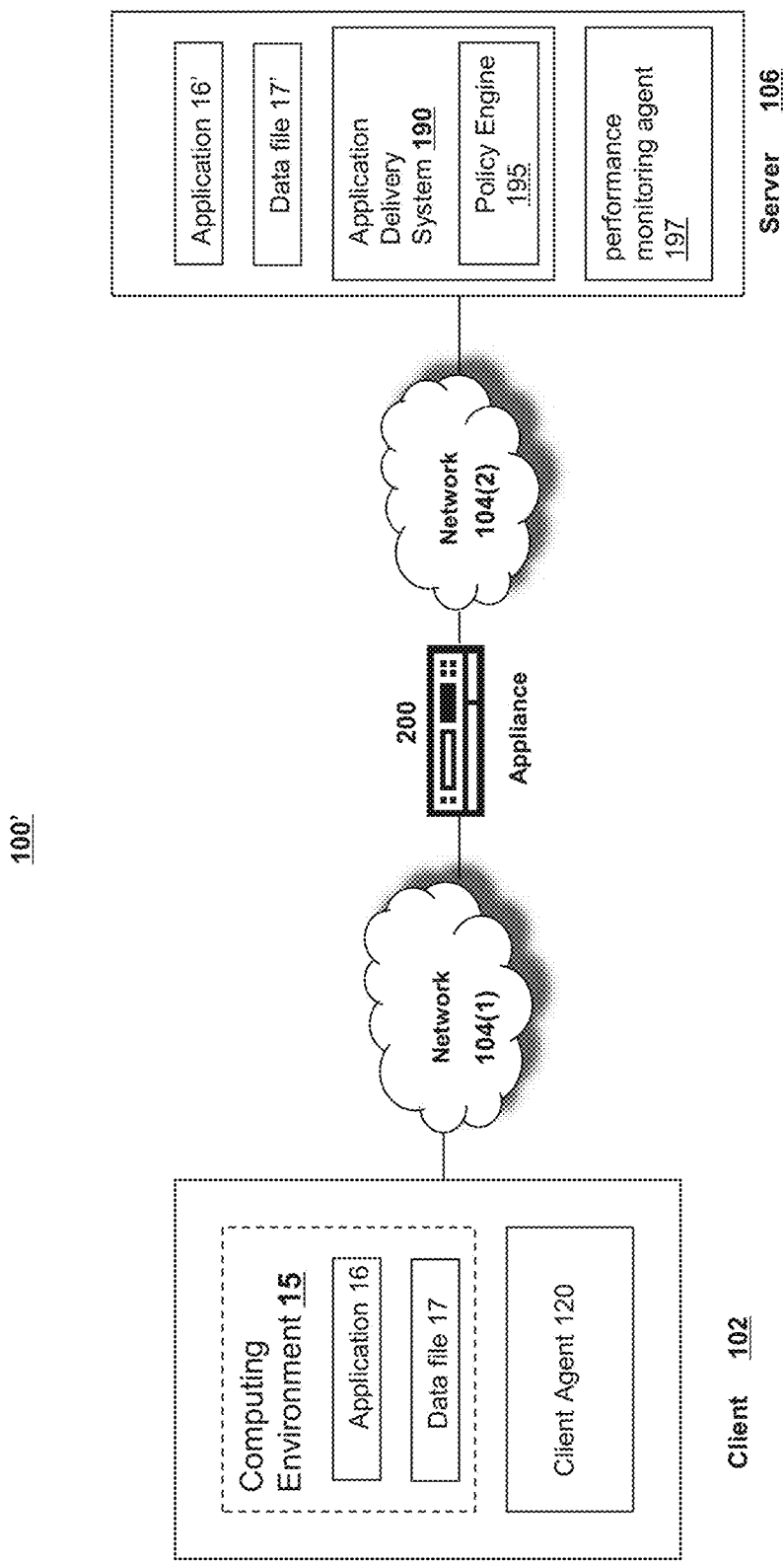
FIG. 1B is a block diagram of a network computing system for delivering a computing environment from a server to a client via an appliance, in accordance with an illustrative embodiment.

Referring to FIG. 1B, an example network environment 100' for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered to the client 102 via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 50 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
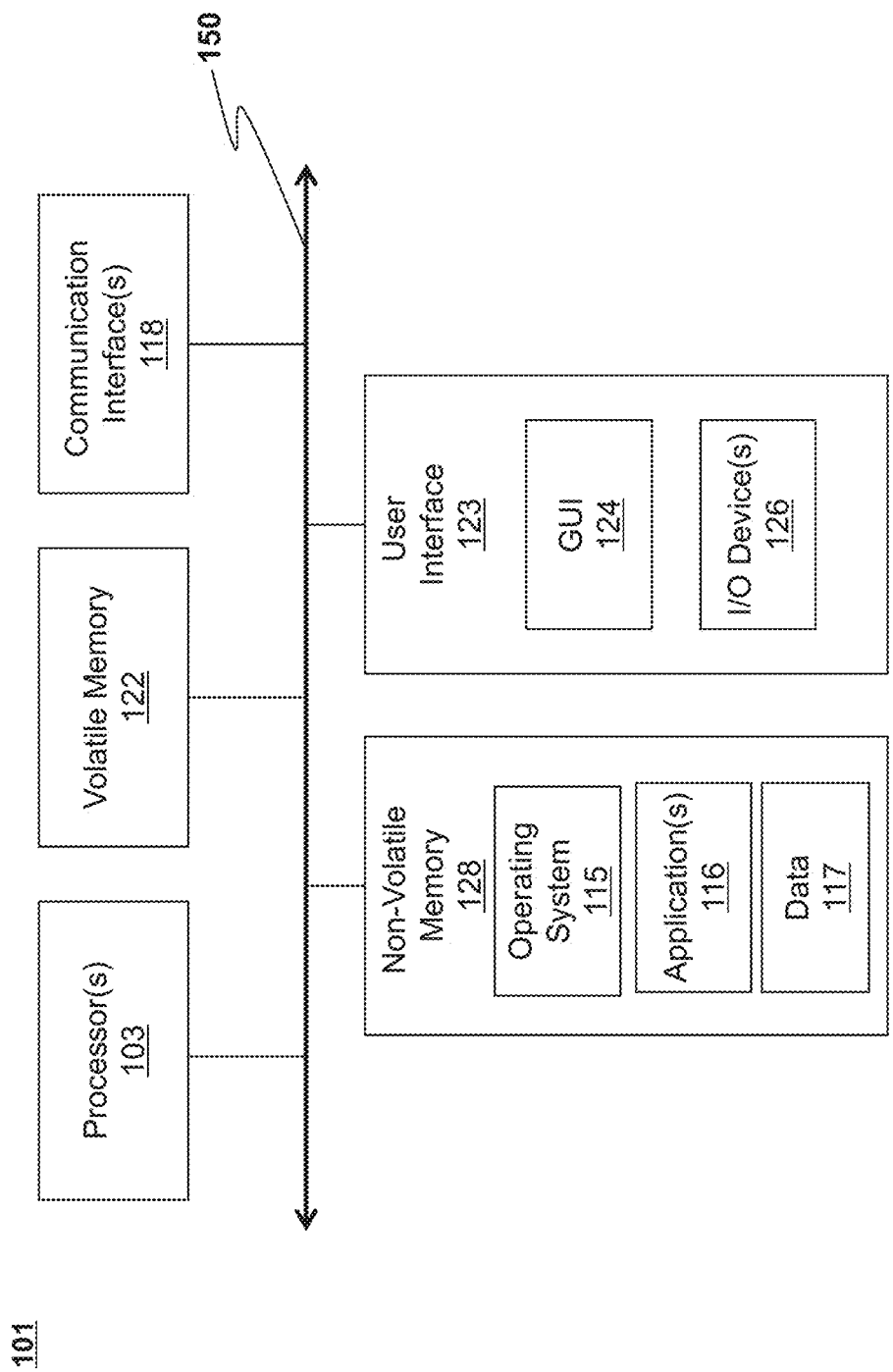
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
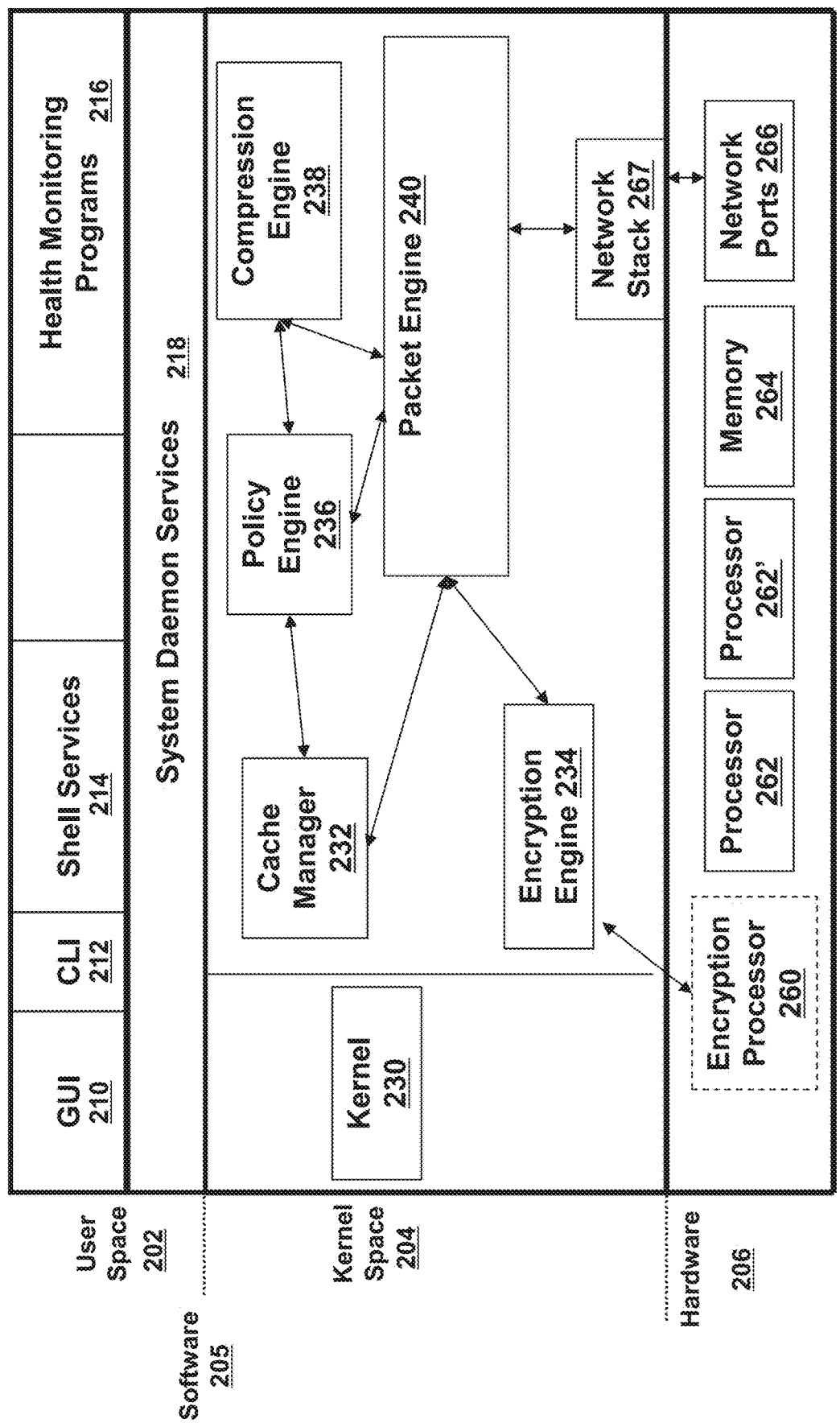
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reduce the access time of the data. In some embodiments, the cache manager 232 may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
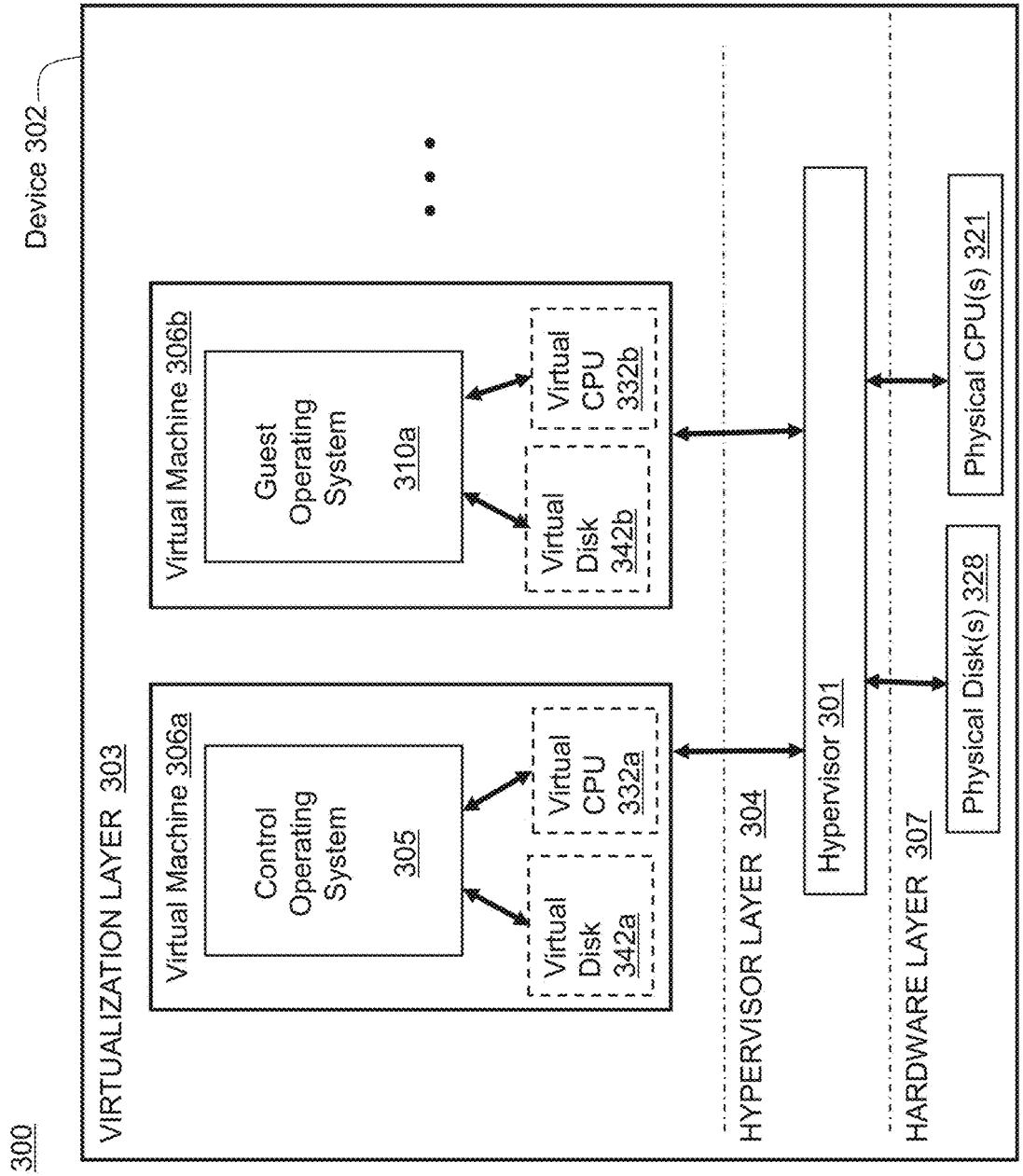
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

D. Systems and Methods for Providing a Distributed Cluster Architecture

Figure 4:
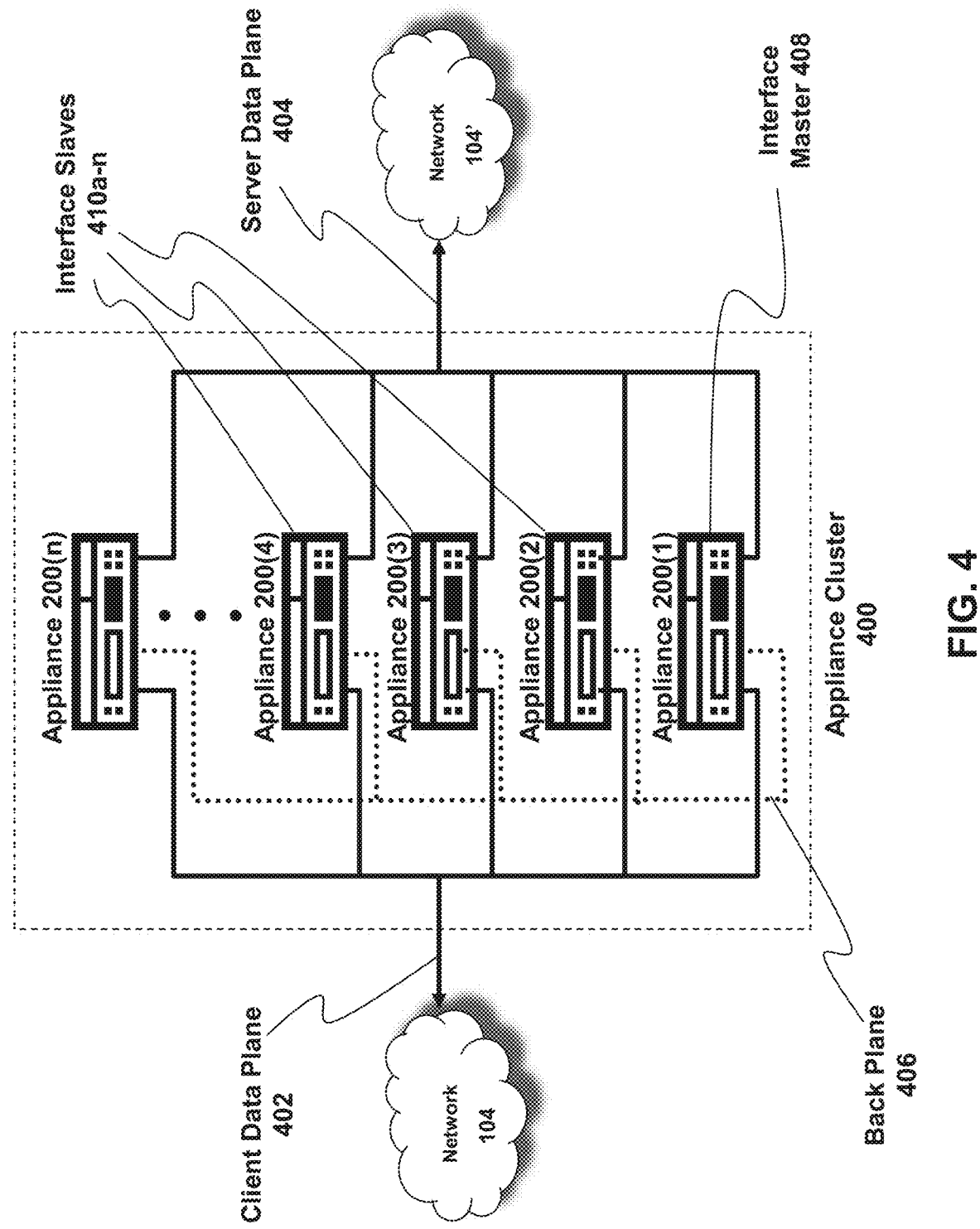
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205. The cluster 400 may include an interface master 408 and one or more interface slaves 410a-n. The interface master 408 may distribute traffic across the appliances 200 including the interface master 408 and the one or more interface slaves 410a-n of the cluster 400.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a client-side network 104 via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104' via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or backplane 406. Backplane 406 may enable inter-node or inter-appliance control and configuration messages, for inter-node forwarding of traffic, and/or for communicating configuration and control traffic from an administrator or user to cluster 400. In some embodiments, backplane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, Fla., the teachings of which are hereby incorporated herein by reference.

E. Systems and Methods for Using Tunnels Based on a Security Level of the Communications Referring now to FIG. 5A, depicted is a system 500 for using tunnels based on a security level of the communications. In overview, the system 500 may include one or more clients 102a-n (hereinafter generally referred to as clients 102), one or more servers 106a-n (hereinafter generally referred to as servers 106), and one or more appliances 200a, 200b (e.g., intermediary devices, network devices, middle box devices, proxy devices) deployed between the clients 102 and the servers 106, among others. The one or more clients 102 and at least one appliance 200a-n (e.g., a client-side appliance 200a) may be in communication with one another via a client-side network 104. In some embodiments, the one or more clients 102 may reside at a branch office and the client-side network 104 may be a private network (e.g., a local area network (LAN) or wide area network (WAN)) between the clients 102 and the client-side appliances 200a. At least one appliance 200a-n (e.g., the client-side appliance 200a) and at least one another appliance 200a-n (e.g., a server-side appliance 200b) may be in communication with one another via an intermediary network 104'. In some embodiments, the intermediary network 104' may be a private network (e.g., a LAN or a software-defined wide area network (SD-WAN)) between the client-side appliances 200a and the server-side appliances 200b. Each appliance 200a-n may include at least one packet analyzer 505a-n, at least one security engine 510a-n, at least one tunnel selector 515a-n, at least one communication engine 520a-n, and at least one database 525a-n, among others. The client-side appliance 200a and the server-side appliance 200b may be connected via one or more communication tunnels 530a-n through the intermediary network 104'. The one or more servers 106 and at least one appliance 200a-n (e.g., the server-side appliance 200b) may be in communication with one another via a server-side network 104". In some embodiments, the servers 106 may reside in a data center, and the server-side network 104" may be a private network (e.g., a local area network (LAN) or wide area network (WAN)) or a public network (e.g., the Internet) between the server-side appliances 200b and the servers 106. An appliance 200a-n can include or correspond to any type or form of intermediary device, network device, middle box device and/or proxy device, such as but not limited to a Netscaler device, SD-WAN device, and so on.

The systems and methods of the present solution may be implemented in any type and form of device, including clients, servers and/or appliances 200. As referenced herein, a "server" may sometimes refer to any device in a client-server relationship, e.g., an appliance 200 in a handshake with a client device 102. The present systems and methods may be implemented in any intermediary device or gateway, such as any embodiments of the appliance or devices 200 described herein. Some portion of the present systems and methods may be implemented as part of a packet processing engine and/or virtual server of an appliance, for instance. The systems and methods may be implemented in any type and form of environment, including multi-core appliances, virtualized environments and/or clustered environments described herein.

Referring also to FIGS. 5B and 5C and in conjunction with FIG. 5A, depicted are a communication diagrams of a sender network device 535 (as depicted in FIG. 5B) and a recipient network device 570 (as depicted in FIG. 5C) in the context of the system 500. The sender network device 535 may be the client-side appliance 200a or the server-side appliance 200b, and may send packets over the network 104' to the recipient sender device 570 via one or more of the communication tunnels 530a-n. The recipient network device 570 may be the client-side appliance 200a or the server-side appliance 200b, and may receive packets over the network 104' from the sender network device 535 via one or more of the communication tunnels 530a-n. In brief overview, referring to FIG. 5B, the packet analyzer 505 (generally referring to packet analyzer 505a-b) on the sender network device 535 may receive packets 540 from one of the clients 102 over the network 104 or one of the servers 106 over the network 104". The packet analyzer 505 may parse each packet 540 to identify an encryption level 555 of the packet 540. The encryption level 555 may indicate a type of cryptographic algorithm and complexity of the cryptographic algorithm applied onto the contents of the packet 540. Using the encryption level 555, the security engine 510 (generally referring to the security engine 510a-b) may determine whether the packet is encrypted to satisfy a threshold level of security (e.g., corresponding to a type of cryptographic algorithm and a level of encryption for the cryptographic algorithm) to determine an encryption sufficiency 560. The encryption sufficiency 560 may identify whether the packet satisfies or fails to satisfy the threshold level of security. Based on the encryption sufficiency 560, the tunnel selector 515 (generally referring to the tunnel selector 515a-b) may select one or more of the communication tunnels 530a-n to send the packet 540 to make a tunnel selection 565. The communication engine 520a on the sender network device 535 (generally referring to the communication engine 520a-b) may send the packets 540 through the communication tunnels 530a-n of the network 104' in accordance with the tunnel selection 565. Referring now to FIG. 5C, the communication engine 520b running on the recipient network device 570 (generally referring to the communication engine 520a-b) may receive the packets 540 through the one or more communication tunnels 530a-n, and may reconstruct the packets 540' to send to one of the clients 102 over the network 104 or one of the servers 106 over the network 104".

In further detail, the sender network device 535 and the recipient network device 570 may be in communication with each other. The sender network device 535 and the recipient network device 570 may initiate, set up, or establish a set of communication tunnels 530a-n via the network 104'. In some embodiments, each communication tunnel 530a-n may be established in accordance with any number of network protocols for point-to-point communications, such as the Generic Routing Encapsulation (GRE), virtual private network (VPN), Secure Sockets Layer virtual private network (SSLVPN), and Internet Protocol Security (IPSec), among others. In some embodiments, the set of communication tunnels 530a-n may be a part of a security association between at least the sender network device 535 and the recipient network device 570 through the network 104'. The security association may include devices (e.g., the sender network device 535, the recipient network device, or any of the appliance 200a-b) that share a common set of security attributes. The set of security attributes may include the cryptographic algorithm, operation and/or function applied in communications among the devices of the security association. In establishing the communication tunnels 530a-n, the sender network device 535 and/or the recipient network device 570 may define or specify the cryptographic algorithm, operation and/or function (or encryption) to apply to the packets 540 exchanged through each communication tunnel 530a-n. At least one communication tunnel 530a-n may be defined to apply encryption to the packets 540 exchanged through the communication tunnel 530a-n. Conversely, at least one communication tunnel 530a-n may be may be implemented or established to not apply any encryption to the packets 540 exchanged through the communication tunnel 530a-n. In some embodiments, the communication tunnels 530a-n may include at least one encrypted tunnel 530a, at least one unencrypted tunnel for payload data 530b, and/or at least one encrypted tunnel for header information 530c for instance, among others. The encrypted tunnel 530a may apply a cryptographic algorithm to the entirety of the packet 540. The unencrypted tunnel 530b may lack any encryption, and may lack any application of a cryptographic algorithm, operation and/or function to the payload data of the packet 540. The encrypted tunnel 530c may apply a cryptographic algorithm, operation and/or function to the header of the packet 540, digest/identification information of the packet 540, and/or other metadata.

The cryptographic algorithm applied by the tunnels 530a-n may include: symmetric-key algorithms, such as block ciphers (e.g., Advance Encryption Standard (AES) of 128 bits or 256 bits, Rivest Cipher-5 (RC5) of 64 bits or 128 bits, or Blowfish cipher), stream ciphers (e.g., A5/1, A5/2, HC-256, or Rivest Cipher-4 (RC4) or 1684 or 2064 bits), or others (e.g., Kerberos protocol); asymmetric-key algorithms (e.g., Digital Signature Algorithm, Elliptic Curve algorithm, Rivest-Shamir-Adleman (RSA), and Diffie-Hellman key exchange protocol); and cryptographic hash functions (e.g., hash-based message authentication code (HMAC), message-digest algorithm (MD5), and Secure Hash Algorithm (SHA-1, SHA-2, and SHA-3)). In some embodiments, the communication tunnels 530a-n may be associated with a level of security (e.g., a defined or predefined level of security). The level of security may include the type of cryptographic algorithm (e.g., AES) and a defined level of encryption (e.g., 256 or 128 bits) for the cryptographic algorithm. The level of encryption for the communication tunnels 530a-n may correspond with a degree of complexity of the cryptographic algorithm. In some embodiments, the sender network device 535 and the receiver network device 570 may each identify the level of security defined for each communication tunnel 530a-n while establishing the communication tunnel 530a-n. In some embodiments, the sender network device 535 and the receiver network device 570 may each store and maintain the level of security defined for each communication tunnel 530a-n on a local database 525a or 525b.

The packet analyzer 505 executing on the sender network device 535 may receive one or more packets 540. If the sender network device 535 corresponds to the client-side appliance 200a, the packet analyzer 505 may intercept, receive, or otherwise identify the one or more packets 540 from one of the clients 102 via the network 104. The client 102 may generate and transmit the one or more packets 540 via the network 104 to the client-side appliance 200a. In some embodiments, an application executing on the client 102 may generate and transmit the one or more packets 540, for instance to request resources for the application hosted on the server 106. On the other hand, if the sender network device 535 corresponds to the server-side appliance 200b, the packet analyzer 505 may intercept, receive, or otherwise identify the one or more packets 540 from one of the servers 106 via the network 104". The server 106 may generate and transmit the one or more packets 540 via the network 104" to the server-side appliance 200b. In some embodiments, the server 106 may generate and transmit the packet 540 to provide resources for the application running on the client 102 in response to a request for the resources received from the client 102. In some embodiments, the packet analyzer 505 may receive or identify the one or more packets 540 generated by the sender network device 535 itself. For example, the packets 540 may be received by the packet analyzer 505 from an application running on the sender network device 535 to be sent over the network 104'.

The application running on the client 102, the sender network device 535, or the recipient network device 570 can include or correspond to any type or form of application. The application can include a network application, a web application, a Software-as-a-Service (SaaS) application, and a remote-hosted application, among others. As some non-limiting examples, an application can include a word processing, spreadsheet or other application from a suite of applications (e.g., Microsoft Office360, or Google docs), an application hosted and executing on a server for remote provisioning to a client, and/or a HTML5-based application.

Each packet 540 received by the packet analyzer 505 may include header information 545 and a payload 550. The header information 545 and the payload 550 of each packet 540 may be generated in accordance with any number of communication protocols at any network stack layer, such as: an Application Layer protocol (e.g., HyperText Transfer Protocol (HTTP), Common Internet File System (CIFS), Messaging Application Programming Interface (MAPI)), a Transport Layer protocol (e.g., Transmission Control Protocol (TCP) and User Datagram Protocol (UDP)), and a Network Layer protocol (e.g., Internet Protocol (IP), Internet Protocol Security (IPsec), and Datagram Delivery Protocol (DDP)), among others. The network stack layer can include any of the layers in the Open Systems Interconnection (OSI) model or the Internet protocol suite.

In some embodiments, the header information 545 for a packet 540 generated in accordance with a Transport Layer (or layer 4 or L4 according to the OSI model) protocol may include Transport Layer header information. In some embodiments, the header information 545 for a packet 540 generated in accordance with a Network Layer (or layer 3 or L3) protocol may include Network Layer header information. In some embodiments, the header information 545 for a packet 540 generated in accordance with an Application Layer protocol may include Application Layer header information. In general, the header information 545 of the packet 540 may include a source address, a source port, a destination address, a destination port, a session identifier, a protocol number, one or more options, and a checksum, among others. The source address or source port may correspond to one of the clients 102 or one of the server 106. The destination address or destination port may correspond to one of the clients 102 or one of the servers 106. The header information 545 may also include one or more header fields (e.g., of HTTP protocol) as specified by the communication protocol.

The header information 545 of the packet 540 may also include metadata. In some embodiments, the metadata of the header information 545 of the packet 540 may be associated with the application running on the client 102. The metadata associated with the application running on the client 120 for which the packet 540 is generated may include, for example, an indicator specifying that the packet 540 is application-specific, an account identifier for the client 102 (e.g., a user profile, email address, or screenname), an application identifier (e.g., a name of the application), a profile of the application (e.g., version number of the application), and a timestamp corresponding to generation of the packet 540, among others. In some embodiments, the metadata of the header information 545 of the packet 540 may be associated with the sender network device 535 itself. The metadata associated with one of the appliances 200a or 200b (e.g., the sender network device 535 or the recipient network device 570) itself may include, for example: an indicator specifying that the packet 540 is device-specific (e.g., appliances 200a, the sender network device 530, or the recipient network device 570), an application identifier (e.g., a name of the application) for the component running on the sender network device 535, a profile for the application (e.g., an identifier or version number of the application), and a timestamp corresponding to generation of the packet 540, among others.

In some embodiments, the header information 545 may also include connection information. The connection information may be included into the header information 545, when the packet 540 is one in a sequence of packets 540 for a previously established connection through one or more of the tunnels 530a-n of the network 104'. In some embodiments, the previously established connection may be between one of the clients 102 and one of the servers 106 via the client-side appliance 200a and the server-side appliance 200b. In this manner, the sender network device 535 and the recipient network device 570 may reuse the same connection or session for packets 540 related to the same connection. The connection information may identify or reference the previously established connection through one or more of the tunnels 530a-n. The connection information may include a connection tuple and session information. The connection tuple may include any tuples of information associate with the packet 540 or the connection for the packet 540. The tuple may include any combination of the source address or source port with the destination address or destination port. The session information may include a session identifier, a sequence number of the packet 540, and a state of the connection (e.g., active or terminated), among others. For previously established connections, the connection information may be stored in the database 525a maintained and/or accessible by the sender network device 535.

The payload 550 of the packet 540 may include data generated by the client 102, the server 106, or the sender network device 535 itself. In some embodiments, the payload 550 of the packet 540 received from the application running on the client 102 may include a request to access resources hosted on the server 106 for the application (e.g., a function call). In some embodiments, the data of the payload 550 (or data of the packet 540) may be unencrypted by the application running on the client 102. In some embodiments, the data of the payload 550 may be encrypted by the application running on the client 102. The application running on the client 102 may apply any number of cryptographic algorithms, operations and/or functions to the data to include into for instance the payload 550 of the packet 540 to send to the server 106. In some embodiments, the payload 550 of the packet 540 received from the server 106 may include data from the resources hosted at the server 106 for the application (e.g., return to the function call) running on the client 102. In some embodiments, the data of the payload 550 may be unencrypted by the server 106. In some embodiments, the data of the payload 550 may be encrypted by the server 106. In response to receipt of a request from the client 102 through the network 104', the server 106 may apply any number of cryptographic algorithms to the data to include into the payload 550 of the packet 540 to send to the client 102. In some embodiments, the client 102 or the server 106 may apply the cryptographic algorithms, operations, and/or functions onto the header information 545 of the packet 540. In some embodiments, the payload 550 of the packet 540 generated by the sender network device 535 itself may be unencrypted.

The cryptographic algorithms applied by the client 102 or the server 106 onto the packet 540 may include: symmetric-key algorithms, such as block ciphers (e.g., Advance Encryption Standard (AES) of 128 bits or 256 bits, Rivest Cipher-5 (RC5) of 64 bits or 128 bits, or Blowfish cipher), stream ciphers (e.g., A5/1, A5/2, HC-256, or Rivest Cipher-4 (RC4) or 1684 or 2064 bits), or others (e.g., Kerberos protocol); asymmetric-key algorithms (e.g., Digital Signature Algorithm, Elliptic Curve algorithm, Rivest-Shamir-Adleman (RSA), and Diffie-Hellman key exchange protocol); and cryptographic hash functions (e.g., hash-based message authentication code (HMAC), message-digest algorithm (MD), and Secure Hash Algorithm (SHA-1, SHA-2, and SHA-3)). In some embodiments, the cryptographic algorithm applied by the client 102 or the server 106 may be at a particular encryption level 555 or a level of security. The level of security may be a numerical value (e.g., an integer from 0 to 10 or a real number between −1 and 1) or an enumerated, alphanumeric identifier (e.g., "low," "medium," and "high"). The cryptographic algorithm may be associated with a level of encryption. The level of encryption may correspond to or may be correlated with a degree of complexity of the cryptographic algorithm applied to the payload 550 of the packet 540. For example, the level of encryption of the cryptographic algorithm may correspond to a length of bits (sometimes referred to as a block size) on which the cryptographic algorithm is applied.

With the receipt or identification of each packet 540, the packet analyzer 505 may determine whether to reuse a previously established connection for delivering the packet 540 through the network 104'. In determining whether to reuse the connection, the packet analyzer 505 may parse the header information 545 of the packet 540 to identify a presence of the connection information. The presence of the connection information may indicate that a connection was previously established for communications between the sender network device 535 and the recipient network device 570, e.g., to exchange the packet 540. The connection information may be used by the sender network device 535 and the recipient network device 570 to maintain a persistent connection through the network 104' via one of the communication tunnels 530a-n. The connection information may include the connection tuple and/or the session information for a previously established connection. The connection information may have been stored in a database 525a and/or generated in response to receipt of the first packet in the previously established connection. The presence of the connection information in the packet 540 may allow reuse of a previously established connection (e.g., that has matching connection information stored or maintained in the database 525a). On the other hand, the lack of connection information in the packet 540 and/or a matching set of connection information in the database 525a may indicate the packet 540 is the first in a sequence of packets 540 for a new connection through the network 104'. When such connection information is not available, the packet analyzer 505 may determine not to reuse any connection through the network 104' for the packet 540. In addition, the packet analyzer 505 may classify the packet 540 as part of an unidentified connection.

In contrast, when such connection information is identified for the packet 540, the packet analyzer 505 may determine to reuse a corresponding connection for the packet 540. The packet analyzer 505 may access the database 525a to determine whether the connection information exists on the database 525a. The database 525a may maintain and store a list of connection information for connections previously established between the sender network device 535 and the recipient network device 570. The packet analyzer 505 may traverse the database 525a to compare the connection information of the packet 540 with the connection information stored on the database 525a. In some embodiments, and by way of an example, the packet analyzer 505 may compare a session identifier included in the connection information with session identifiers stored on the database 525a. Upon finding a match, the packet analyzer 505 may determine that the connection information of the packet 540 is on (or matches that in) the database 525a. A match may indicate that the connection was previously established between the sender network device 535 and the recipient network device 570, and that the connection is still alive. Additionally, the packet analyzer 505 may classify the packet 540 as part of an identified connection. In some embodiments, the packet analyzer 505 may also increment the sequence number of the session information for the connection associated with the packet 540 in response to finding the match. The sequence number can indicate the numbers of packets matched with an established or identified connection. If no match is found, however, the packet analyzer 505 may determine that the connection information of the packet 540 is not on the database 525a. Furthermore, the packet analyzer 505 may classify the packet 540 as part of an unidentified connection.

In addition, the packet analyzer 505 may parse the packet 540 to identify the level of security of the cryptographic algorithm applied to the payload 550. In some embodiments, the identification of the level of security may be responsive to the determination to not reuse any connection for the packet 540. The level of security of the cryptographic algorithm may include the type of cryptographic algorithm, operation and/or function, and a level of encryption (e.g., number of bits of encryption) for the cryptographic algorithm. To identify the level of security (sometimes herein referred to as the encryption level 555), the packet analyzer 505 may parse the header information 545 or other portion of the packet 540 to identify metadata or information included therein (sometimes generally referred to as metadata). The metadata can indicate or include information about the level of security of encryption applied on the payload and/or other portions of the packet 540. In some embodiments, the packet analyzer 505 may identify the indicator that the packet 540 is application-specific, the application identifier, or the profile of the application from the metadata. Based on the metadata, the packet analyzer 505 may identify the level of security of the cryptographic algorithm applied to the payload 550. Each application may apply or may otherwise be associated with one or more cryptographic algorithms applied onto the payload 550 of the packet 540 with a corresponding level of security.

In identifying the level of security, the packet analyzer 505 may compare the metadata to a list defining a level of security for each application. The list may define or indicate a level of security for each application by application identifier and/or profile. The list may be stored and maintained on the database 525a of the sender network device 535 and/or also on the database 525b of the recipient network device 570. The list may be generated by a network administrator managing the devices of the network 104', such as the sender network device 535 and the recipient network device 570. The list may be provided to the sender network device 535 for storage onto the database 525a. Applications running on the client 102 may have higher or equal levels of security than applications running on the appliance 200a or 200b. In some embodiments, the list may also indicate a type of cryptographic algorithm and a level of encryption associated with the application identifier and/or profile. In some embodiments, the packet analyzer 505 may compare the application identifier and/or profile parsed from the metadata of the header information 545 with application identifiers and/or profiles indexed in the list. Responsive to finding a match with the list, the packet analyzer 505 may identify the level of security indicated in the list for the matching application identifier and profile. In some embodiments, the packet analyzer 505 may identify the type of cryptographic algorithm and the level of encryption indicated in the list for the matching application identifier and profile.

In addition, the packet analyzer 505 may parse the packet 540 to identify other information about the packet 540. The packet analyzer 505 may identify a network stack layer or a communication protocol for the packet 540. As discussed above, the packet 540 may be in accordance with any number of communication protocols at any network stack layer. In identifying the communication protocol, the packet analyzer 505 may parse the packet 540 to identify a portion of the header information 545 for instance. In some embodiments, the portion of the header information identified may exclude the metadata. The portion of the header information 545 may include the source address, source port, destination address, destination port, protocol number, one or more options, and checksum, among others. The packet analyzer 505 may compare the portion of the header information 545 with a set of templates for network stack layers and communication protocols. Each template may define or specify fields of the header for each network stack layer and the communication protocol at the network stack layer. Responsive to finding a match between the header information 545 of the packet 540 with one of the templates, the packet analyzer 505 may identify the network stack layer and the communication protocol corresponding to the match.

The security engine 510 executing on the sender network device 535 may determine whether the packet 540 meets or satisfies a threshold level of security. To carry out the determination, the security engine 510 may identify or determine the threshold level of security for the packet 540 to be communicated through one of the tunnels 530a-n. The threshold level of security may indicate a type and/or a minimum strength (or level) of the encryption applied to the data of the packet 540 for secure communications over the network 104'. The threshold level may include a specified type of cryptographic algorithm and a threshold level of encryption. The threshold level of encryption may define a minimum complexity for the cryptographic algorithm applied to the data of the packet 540 for secure communications over the network 104'. In some embodiments, the security engine 510 may determine the threshold level of security in accordance to a security policy. The security policy may specify the threshold level of security for the packet 540 based on any number of factors related to the packet 540. In some embodiments, the security policy may also specify the type of cryptographic algorithm and threshold level of encryption for the threshold level of security based on the factors. The factors may include, for example, the header information 545 (e.g., metadata), the communication protocol, or the network stack layer, or any combination thereof. In some embodiments, the security policy may specify the type of cryptographic algorithm and the threshold level of encryption for each communication protocol or network stack layer. For example, the security policy may specify:

| Network Stack Layer | Communication Protocol | Type of Cryptographic Algorithm for Threshold |
|---|---|---|
| L4 | HTTPS | AES256 or AES128 |
| L3 | CIFS | Kerberos with AES |
| L3/L4 | MAPI | Kerberos with AES |

In some embodiments, the security engine 510 may compare the identified communication protocol to the communication protocols listed in the security policy. Upon finding a match with one of the communication protocols in the security policy, the security engine 510 may identify the type of cryptographic algorithm, mechanism and/or function, and the threshold level of encryption for the matching communication protocol. In some embodiments, the security engine 510 may compare the identified network stack layer to the network stack layers listed in the security policy. With the determination of a match with one of the network stack layers listed in the security policy, the security engine 510 may identify the threshold level of security and the type of cryptographic algorithm, mechanism and/or function for the corresponding network stack layer.

In some embodiments, the security engine 510 may compare the metadata identified from the packet 540 with the metadata listed in the security policy. In some embodiments, the security policy may specify the cryptographic algorithm, mechanism and/or function, and the threshold level of encryption for the application identifier and profile of the application. In some embodiments, the security engine 510 may compare the application identifier or profile parsed from the packet 540 with the application identifiers and profiles listed in the security policy. Responsive to determining a match between the application identifier or profile with one listed in the security policy, the security engine 510 may identify the cryptographic algorithm, mechanism and/or function and the threshold level of encryption corresponding to the application identifier or profile. In some embodiments, the security policy may specify the cryptographic algorithm, mechanism and/or function, and the threshold level of encryption for the indicator identifying whether the packet 540 is application-specific or device-specific. For example, the security policy may specify that the threshold level of security for indicators identifying that the packet 540 is application-specific, is to be greater than the threshold level of security for indicators identifying that the packet 540 is device-specific. In some embodiments, the security engine 510 may compare the indicator parsed from the packet 540 with the indicators listed in the security policy. With the determination of a match between the indicator and one listed in the security policy, the security engine 510 may identify the cryptographic algorithm and the threshold level of encryption for the matching indicator.

With the determination of the threshold level of security, the security engine 510 may compare the identified level of security of the cryptographic algorithm applied to the packet 540 with the threshold level of security. In some embodiments, the security engine 510 may compare the identified type of cryptographic algorithm, mechanism and/or function, and the level of encryption to the specified type of cryptographic algorithm, mechanism and/or function, and the threshold level of encryption. The type of cryptographic algorithm, mechanism and/or function, and the threshold level of encryption may be specified by the security policy. The security engine 510 may determine whether the type of cryptographic algorithm, mechanism and/or function identified from the packet 540 matches the specified type of cryptographic algorithm. If the type of cryptographic algorithm identified from the packet 540 is determined to not match, the security engine 510 may determine that the level of security is less than the threshold level of security. In addition, the security engine 510 may determine that the packet 540 does not meet or satisfy the threshold level of security. On the other hand, if the type of cryptographic algorithm identified from the packet 540 is determined to match, the security engine 510 may compare the level of encryption identified from the packet 540 to the threshold level of encryption. When the level of encryption identified from the packet 540 is determined to be greater than or equal to the threshold level of encryption, the security engine 510 may determine that the level of security is greater than or equal to the threshold level of security. Furthermore, the security engine 510 may determine that the packet 540 meets, exceeds and/or satisfies the threshold level of security. The security engine 510 may also classify the connection associated with the packet 540 as a secure connection. In contrast, when the level of encryption identified from the packet 540 is determined to be less than the threshold level of encryption, the security engine 510 may determine that the level of security is less than the threshold level of security. Additionally, the security engine 510 may determine that the packet 540 does not meet or satisfy the threshold level of security. The security engine 510 may further classify the connection associated with the packet 540 as an insecure connection.

The tunnel selector 515 executing on the sender network device 535 may select one or more of the communication tunnels 530a-n to send the packet 540 to the recipient device 570 through the network 104'. The selection of one or more of the communication tunnels 530a-n may be based on the determination of whether the packet 540 meets or satisfies the threshold level of security. When packet 540 is determined to not meet or satisfy the threshold level of security, the tunnel selector 515 may select the at least one communication tunnel 530a-n with a defined level of security greater than or equal to the threshold level of security. As described above, each communication tunnel 530a-n may have a defined level of security. The defined level of security for the communication tunnel 530a-n may include the type (if any) of cryptographic algorithm, mechanism and/or function, and the level of encryption (if any) for the cryptographic algorithm. The tunnel selector 515 may compare the threshold level of security with the defined level of security for each communication tunnel 530a-n. In comparing the levels of security, the tunnel selector 515 may identify a subset of communication tunnels 530a-n with a cryptographic algorithm matching the cryptographic algorithm of the threshold level of security. From the subset of communication tunnels 530a-n with the matching cryptographic algorithm, the tunnel selector 515 may select at least one communication tunnel 530a-n with a level of encryption greater than or equal to the threshold level of encryption. In some embodiments, the tunnel selector 515 may select the encrypted tunnel 530a, responsive to the determination that the level of security identified from the packet 540 is less than the threshold level of security. As discussed above, the encrypted tunnel 530a may apply a cryptographic algorithm to the header information 545 and/or the payload 550 of the packet 540.

Conversely, when packet 540 is determined to meet or satisfy the threshold level of security, the tunnel selector 515 may select at least one communication tunnel 530a-n with a defined level of security less than the level of security identified for the packet 540. For instance, the selected at least one communication tunnel 530a-n may correspond to at least one communication tunnel 530a-n that is unencrypted and/or unsecured. In addition, the tunnel selector 515 may select at least one communication tunnel 530a-n with a defined level of security greater than the threshold level of security. The communication tunnel 530a-n with the defined level of security less than the level of security identified for the packet 540 (e.g., unencrypted tunnel 530b) may be for delivering the (already encrypted) payload 550 of the packet 540. The communication tunnel 530a-n with the defined level of security greater than or equal to the threshold level of security (e.g., encrypted tunnel 530c) may be for delivering the header information 545 of the packet 540. In some embodiments, the tunnel selector 515 may select the unencrypted tunnel for payload data 530b and the encrypted tunnel 530a or the encrypted tunnel for header information 530c, responsive to the determination that the level of security is greater than or equal to the threshold level of security. As discussed above, the unencrypted tunnel 530b may maintain the payload 550 of the packet 540 as is without any additional application of a cryptographic algorithm, mechanism and/or function. Furthermore, the encrypted tunnel 530c may apply the defined cryptographic algorithm, mechanism and/or function to the header information 545 delivered through the tunnel 530c.

In some embodiments, to select the communication tunnels 530a-n, the tunnel selector 515 may compare the level of security for the packet 540 with the defined levels of security for each communication tunnel 530a-n. The tunnel selector 515 may identify a subset of communication tunnel 530a-n with a cryptographic algorithm matching the cryptographic algorithm identified from the packet 540. From the subset of communication tunnels 530a-n with the matching cryptographic algorithm, the tunnel selector 515 may select at least one communication tunnel 530a-n with a level of encryption less the level of encryption of the packet 540. Furthermore, the tunnel selector 515 may compare the threshold level of security with the defined levels of security for each communication tunnel 530a-n. The tunnel selector 515 may identify a subset of communication tunnel 530a-n with a cryptographic algorithm, mechanism and/or function matching the cryptographic algorithm, mechanism and/or function specified by the threshold level of security. From the subset of communication tunnels 530a-n with the matching cryptographic algorithm, mechanism and/or function, the tunnel selector 515 may select at least one communication tunnel 530a-n with a level of encryption greater than or equal to the threshold level of encryption.

In some embodiments, the tunnel selector 515 may select one or more of the communication tunnels 530a-n based on the determination of whether to reuse a previously established connection for the packet 540. In some embodiments, the tunnel selector 515 may select one or more of the communication tunnels 530a-n based on the determination of whether the connection information is found on the database 525a. As discussed above, when the previously established connection is determined to be reused, the database 525a may be accessed to determine whether the connection information is found on the database 525a. When the connection information is found on the database 525a, the tunnel selector 515 may select at least one communication tunnel 530a-n with a defined level of security less than the level of security identified for the packet 540. In addition, the tunnel selector 515 may select at least one communication tunnel 530a-n with a defined level of security greater than the threshold level of security. The communication tunnel 530a-n with the defined level of security less than level of security identified for the packet 540 may be for delivering the payload 550 of the packet 540 (e.g., unencrypted tunnel 530b). The communication tunnel 530a-n with the defined level of security greater than or equal to the threshold level of security may be for delivering the header information 545 (and/or an identifier or digest) of the packet 540 (e.g., encrypted tunnel 530c). In some embodiments, the tunnel selector 515 may select the unencrypted tunnel 530b and the encrypted tunnel 530c upon finding the connection information for the packet 540 in the database 525a. On the other hand, when the connection information is not found on the database 525a, the tunnel selector 515 may establish and/or select at least one communication tunnel 530a-n with a defined level of security greater than or equal to the threshold level of security. In some embodiments, the tunnel selector 515 may select the encrypt channel 530a when the connection information is not found on the database 525a.

The communication engine 520a executing on the sender network device 535 may deliver, transmit, or otherwise communicate the packet 540 via one or more of the selected communication tunnels 530a-n. When the packet 540 is determined to not meet or satisfy the threshold level of security, the communication engine 520a may communicate the entirety of the packet 540 without partition (e.g. separation into different portions such as payload and header data) via the one or more selected communication tunnels 530a-n. The packet 540 without partition sent through the selected communication tunnels 530a-n may include both the header information 545 and the payload data 550 as part of the same packet 540. In some embodiments, the communication engine 520a may communicate the entirety of the packet 540 via the selected communication tunnel 530a-n when the connection information for the packet 540 is not found in the database 525a. The one or more selected communication tunnels 530a-n may have a defined level of security greater than or equal to the threshold level of security (e.g., the encrypted tunnel 530a). In communicating the entirety of the packet 540, the communication engine 520a may apply the cryptographic algorithm, mechanism and/or function defined for the selected communication tunnel 530a-n. In some embodiments, the communication engine 520a may apply the cryptographic algorithm, mechanism and/or function with the defined level of encryption for the selected communication tunnel 530a-n to the packet 540.

In contrast, when the packet 540 is determined to meet or satisfy the threshold level of security, the communication engine 520a may split or partition the packet 540 in to two or more portions for sending in two or more tunnels. For example, the communication engine 520a may split or partition the header information 545 and the payload 550 of the packet 540. In some embodiments, the communication engine 520a may split or partition the header information 545 and the payload 550, responsive to a determination that the connection information for the packet 540 is found in the database 525a. While the payload 550 may be encrypted using the cryptographic algorithm, mechanism and/or function applied by the client 102, the server 106, or the sender network device 530, the header information 545 may be left unencrypted. The communication engine 520a may deliver, transmit, or otherwise communicate the payload 550 via the selected communication tunnel 530a-n with a defined cryptographic algorithm, mechanism and/or function, and a level of encryption less the level of encryption of the packet 540. In some embodiments, the communication tunnel 530a-n selected for communicating the payload 550 may include the unencrypted tunnel 530b. In addition, the communication engine 520a may deliver, transmit, or otherwise communicate the header information 545 via the selected communication tunnel 530a-n with a defined cryptographic algorithm and a level of encryption greater the threshold level of encryption. In some embodiments, the communication tunnel 530a-n established and/or selected for communicating the header information 545 may include the encrypted tunnel 530c.

With the partitioning of the header information 545 from the payload 550, the communication engine 520a may generate an identifier for the payload 550. In some embodiments, the identifier for the payload 550 may include a digest of the payload 550. To generate the digest, the communication engine 520a may apply a hash algorithm to at least a portion of the payload 550. The hash algorithm applied to the payload 550 may include a cyclic redundancy check (e.g., CRC-16, CRC-32, or CRC-64), a checksum (e.g., Luhn algorithm), or a cryptographic hash function (e.g., Secure-Hash Algorithm (SHA-1, SHA-2, SHA-3) or Message Digest Algorithm (MD2, MD5, MD6)), among others. The portion of the payload 550 to which the hash algorithm may be applied by the communication engine 520a may include at least a portion of the Transport Layer payload, a Network Layer payload, at least a portion the Network Layer payload, or at least a portion of the Application Layer payload, among others. Once generated, the communication engine 520a may use the digest as the identifier for the payload 550. The communication engine 520a may insert, concatenate, append, or otherwise add the identifier for the payload 550 (e.g., the digest of the payload 550) to the header information 545. In communicating the header information 545, the communication engine 520a may apply the cryptographic algorithm, mechanism and/or function defined for the selected communication tunnel 530a-n to the header information 545 and the identifier for the payload 550. In some embodiments, the communication engine 520a may apply the cryptographic algorithm with the defined level of encryption for the selected communication tunnel 530a-n to the header information 545.

In some embodiments, the communication engine 520a may maintain the database 525a with connection information of the connections through the network 104'. If the determination is to (establish and use a new connection and) not re-use a previously established connection for the packet 540, the communication engine 520a may generate connection information (for the new connection) using the header information 545. As discussed above, the connection information may include the connection tuple and the session information for the new connection. To generate the connection tuple for the connection information, the communication engine 520a may parse the packet 540 to identify the header information 545. From the header information 545, the communication engine 520a may identify the source address, the source port, the destination address, and/or the destination port. Using the source address, the source port, the destination address, and/or the destination port, the communication engine 520a may generate connection tuple for the connection information. In addition, to generate the session information, the communication engine 520a may generate a session identifier for the connection for the packet 540. The session identifier may be a set of alphanumeric characteristics referencing the connection associated with the packet 540. The communication engine 520a may in some embodiments generate a sequence number and set the sequence number to a value indicating that the packet 540 is the first in the sequence of packets for the connection. The communication engine 520a may generate an indication of the state of the connection, and may initially set the indication of the state of the connection to active. With the generation of the connection tuple and/or the session information, the communication engine 520a may store the connection information onto the database 525a. In some embodiments, the communication engine 520a may add any portion of the connection information to the header information 545 of a packet as the header information 545 or the payload 550 is sent via the selected communication tunnels 530a-n. In some embodiments, the communication engine 520a executing on the sender network device 535 may transmit or provide any portion of the connection information for the packet 540 to the recipient network device 570 for storage on the database 525a on the recipient network device 570 via the network 104'. The provision of the connection information to the recipient network device 570 may be out-of-band relative to the transmission of the packet 540, for instance.

On the recipient network device 570, the communication engine 520b may receive the packet 540 via the communication tunnels 530a-n through the network 104' from the sender network device 535. The communication engine 520b may receive the entirety of the packet 540 via the communication tunnels 530a-n (e.g., the encrypted tunnel 530a). As described above, the entirety of the packet 540 may be received through the network 104' through at least one communication tunnel 530a-n, when the sender network device 535 has determined that the packet 540 does not satisfy the threshold level of security. The communication engine 520b may also receive the header information 545 and the payload 550 separately from multiple communication tunnels 530a-n (e.g., the encrypted tunnel 530c and the unencrypted tunnel 530b, or the encrypted tunnel 530a and the unencrypted tunnel 530b). As previously discussed, the header information 545 and the payload may be sent separately through different communication tunnel 530a-n, when the sender network device 535 has determined that the packet 540 satisfies the threshold level of security. In some embodiments, the communication engine 520b may identify through which communication tunnels 530a-n the packet 540, the header information 545, and/or the payload 550 is received. Using the identifications of the communication tunnels 530a-n, the communication engine 520b may counter or determine a number of communication tunnels 530a-n.

Upon receipt of the packet 540, the header information 545, or the payload 550, the communication engine 520b may determine whether the connection associated with the packet 540, header information 545, and/or the payload 550 is validated. To validate the connection, the communication engine 520b may for example parse the packet 540 or the header information 545 to identify the connection information included in the packet 540. The communication engine 520b may also access the database 525b of the recipient network device 570 to determine whether the connection information exists on the database 525b. The communication engine 520b may traverse the database 525b to compare the connection information of the packet 540 with the connection information stored on the database 525b. In some embodiments, the communication engine 520b may compare the session identifier included in the connection information with the session identifiers stored on the database 525b. Upon finding a match, the communication engine 520b may determine that the connection information of the packet 540 is on the database 525b. Additionally, the communication engine 520b may determine that the connection is validated. In some embodiments, the communication engine 520b may increment the sequence number of the session information for the connection associated with the packet 540 in response to finding the match. If no match is found, however, the communication engine 520b may determine that the connection information of the packet 540 is not on the database 525b. Furthermore, the communication engine 520b may determine that the connection is not validated.

When the connection is determined to not be validated, the communication engine 520b may process the entirety of the packet 540 from the at least one communication tunnel 530a-n. In some embodiments, the communication engine 520b may receive the entirety of the packet 540 from one of the communication tunnels 530a-n (e.g., encrypted tunnel 530a). In receiving the packet 540, the communication engine 520b may apply a cryptographic algorithm to decrypt the packet 540. In some embodiments, the communication engine 520b may identify the cryptographic algorithm/mechanism/function and the level of encryption of the communication tunnel 530a-n through which the packet 540 is delivered. As described above, the recipient network device 570 may identify the level of security including the cryptographic algorithm/mechanism/function and the level of encryption when establishing each communication tunnel 530a-n. The communication engine 520b may apply the identified cryptographic algorithm/mechanism/function to the packet 540 at the level of encryption for the communication tunnel 530a-n. In applying the cryptographic algorithm/mechanism/function, the communication engine 520b may decrypt the packet 540 to generate a recovered packet 540'. The recovered packet 540' may have a recovered header information 545' and payload 550'. When running on the client-side appliance 200a, the communication engine 520b may route or forward the recovered packet 540' to the client 102 via the network 104. When running on the server-side appliance 200b, the communication engine 520b may route or forward the recovered packet 540' to the server 106 via the network 104".

On the other hand, when the connection is determined to be validated, the communication engine 520b may process the header information 545 and the payload 550 received from different communication tunnels 530a-n. The header information 545 and the payload 550 may arrive at the recipient network device 570 through different communication tunnels 530a-n (e.g., unencrypted tunnel 530b and encrypted tunnel 530c). In addition, the communication tunnel 530a-n through which the header information 545 is delivered (e.g., encrypted tunnel 530c) may apply a cryptographic algorithm onto the header information 545. In contrast, the communication tunnel 530a-n through which the payload 550 is delivered (e.g., unencrypted tunnel 530b) may lack application of a cryptographic algorithm onto the payload 550 by the communication tunnel 530a-n. As a cryptographic algorithm is applied to the header information 545, the communication engine 520b may apply a cryptographic algorithm of the communication tunnel 530a-n through which the header information 545 is delivered to decrypt the header information 545. In some embodiments, the communication engine 520b may identify the cryptographic algorithm and the level of encryption of the communication tunnel 530a-n through which the header information 545 is delivered. As described above, the recipient network device 570 may identify the level of security including the cryptographic algorithm and the level of encryption when establishing each communication tunnel 530a-n. The communication engine 520b may apply the identified cryptographic algorithm to header information 545 at the level of encryption for the communication tunnel 530a-n. In applying the cryptographic algorithm, the communication engine 520b may decrypt the received header information 545 to generate recovered header information 545'. In contrast, the communication engine 520b may maintain the received payload data 550 received through the different communication tunnel 520a-n (e.g., unencrypted tunnel 530b) without applying any cryptographic algorithm. The communication engine 520b may use the payload data 550 as the recovered payload data 550' without applying any cryptographic algorithm to the received payload data 550. In this manner, consumption of computing resources on the recipient network device 570 may be reduced, relative to applying the cryptographic algorithm on both the header information 545 and the payload data 550.

With the header information 545 and the payload 550 received through different communication tunnels 530a-n, the communication engine 520b may associate (e.g., match, pair, link, combine) header information 545' with the payload 550' to reconstruct or recover a packet 540'. The communication engine 520b may parse the decrypted header information 545' to retrieve or identify the identifier for the payload 550. In some embodiments, the communication engine 520b may parse the decrypted header information 545 to identify the digest of the payload 550'. To associate the header information 545 with the payload 550', the communication engine 520b may generate a separate identifier of the payload 550' received via the communication tunnels 530a-n. The identifier for the payload 550' may include a digest of the payload 550'. In some embodiments, to generate the digest of the payload 550', the communication engine 520b may apply a hash algorithm to at least at portion of the received payload 550'. The communication engine 520b may compare the identifier of the payload 550' parsed from the decrypted header information 545' to the identifier generated from the received payload 550'. The comparison may be between the digest of the payload 550' from the header information 545' and the digest generated from the received payload 550'. If the identifiers match, the communication engine 520b may associate the header information 545' with the payload 550'. With the association, the communication engine 520b may generate a reconstructed packet 540' having the header information 545' and the payload 550'. In some embodiments, the communication engine 520b may combine the header information 545' and the payload 550' to generate the packet 540'. In contrast, if the identifiers do not match, the communication engine 520b may not associate the header information 545' and the payload 550'. The communication engine 520b may also wait for receipt of another payload 550' from the communication tunnel 530a-n to appropriately associate with the header information 545'.

In some embodiments, the communication engines 520a and 520b each may maintain a timer to keep track of each connection. The communication engines 520a and 520b may identify a time of communication of each packet 540 for the connection. With the exchange of the packet 540, the communication engines 520a and 520b may start the timer to identify a time elapsed since the last communication of the packet 540. The communication engines 520a and 520b may compare the elapsed time to a connection timeout limit. The connection timeout limit may correspond to an amount of time at which the connection is to be terminated when no further packets 540 are exchanged. If the time elapsed is determined to be greater than the connection timeout limit, the communication engine 520a and 520b may determine that the connection associated with the packet 540 is no longer active or terminated. In some embodiments, the communication engine 520a and 520b may also delete the connection information associated with the packet 540 from the database 525a and 525b. In some embodiments, the communication engine 520a and 520b may set the state of the session information included in the connection information associated with the packet 540 to terminated.

Referring now to FIG. 6A, depicted is a flow diagram for a method 600 of using tunnels according to a security level of the communications. The functionalities of method 600 may be implemented using, or performed by, the components described in FIGS. 1-5C, such as the appliance 200a-n. In brief overview, a sender network device (e.g., the appliance 200a or 200b or the sender network device 535) may identify a packet (605). The sender network device may determine whether to re-use the connection (610). If the connection is to be reused, the sender network device may determine whether an identifier is in the database (615). If the identifier is in the database, the sender network device may select unencrypted and encrypted tunnels (645). If the identifier is not in the database, the sender network device may select an encrypted tunnel (620). On the other hand, if the connection is not to be reused, the sender network device may identify a security level (625). The sender network device may determine whether the security level is greater than or equal to a threshold (630). If the security level is less than the threshold, the sender network device may select the encrypted tunnel (620). Otherwise, if the security level is greater than or equal to the threshold, the sender network device may add an identifier to the database (635). The sender network device may partition the payload and the header (640). The sender network device may then select unencrypted and encrypted tunnels (645).

In further detail, the sender network device may identify a packet (605). The packet may include a header and payload data. The header may include a source address, a source port, a destination address, and/or a destination port, among others. The header may include metadata associated with an application for which the packet is generated. The header may also include connection information in some embodiments. The connection information may include a connection tuple and session information. The connection tuple may include a combination of a source and a destination. The session information may include a session identifier. In addition, the sender network device may identify a set of communication tunnels for the packet. The set of communication tunnels may include an encrypted tunnel for the header and the payload, an unencrypted tunnel for the payload, and an encrypted tunnel for the header, among others.

The sender network device may determine whether to re-use the connection (610). The sender network device may parse the header of the packet to identify a presence of the connection information. The presence of the connection information may indicate or enable the re-use of a previously established connection between the sender network device and the recipient network device for the exchange of packets. On the other hand, a lack of the connection information may indicate that the packet is a first packet to establish a new session and/or connection. With the identification of the presence of the connection information from the packet, the sender network device may determine to re-use the previously established connection for the packet, as described further below. In contrast, with the identification of a lack of any connection information from the packet, the sender network device may determine to not re-use the previously established connection for the packet.

If the previously established connection is to be reused, the sender network device may determine whether an identifier (e.g., session identifier) is in the database (615). The sender network device may parse the connection information of the header in the packet to identify the session identifier. Using the session identifier, the sender network device may access a database to find the session identifier in the database. The database may maintain a list of connection information for live connections between the sender network device and the recipient network device. The existence of the session identifier on the database may indicate that the previously established connection is still alive, and that the connection may be reused to communicate the packet. If the session identifier is not in the database, the sender network device may select (e.g., establish, identify and/or use) the encrypted tunnel for both the header and the payload (620). The encrypted tunnel may apply a cryptographic algorithm to both the header and the payload. If the session identifier is in the database, the sender network device may select the unencrypted tunnel for the payload and the encrypted tunnel for the header (645). The unencrypted tunnel for the payload may not apply a cryptographic algorithm to the payload to maintain the encryption of the payload. The encrypted tunnel for the header may apply a cryptographic algorithm, mechanism and/or function to the header.

On the other hand, if the existing connection is not to be reused, the sender network device may identify a security level (625). The sender network device may parse the header of the packet to identify metadata related to and/or indicative of the application. Certain applications may be associated with a particular security level. The security level may include a type of encryption algorithm and an encryption level. Using the metadata, the sender network device may identify the security level. The sender network device may determine whether the security level is greater than or equal to a threshold (630). The threshold may specify a type of cryptographic algorithm/mechanism/function and a threshold encryption level. In comparing the security level, the sender network device may determine whether identified cryptographic algorithm matches the cryptographic algorithm of the threshold. If there is no match, the sender network device may determine that the security level is less than the threshold. On other hand, if there is a match, the sender network device may compare the encryption level identified for the packet and the threshold encryption level. If the identified encryption level is greater than or equal to the threshold encryption level, the sender network device may determine that the security level is greater than or equal to the threshold. On the other hand, if the identified encryption level is less than the threshold encryption level, the sender network device may determine that the security level is less than the threshold. If the security level is less than the threshold, the sender network device may select the encrypted tunnel (620).

Otherwise, if the security level is greater than or equal to the threshold, the sender network device may add an identifier to the database (635). The sender network device may generate a session identifier for the connection information to establish the connection through the network between the sender network device and the recipient network device. The database may maintain the list of active connections between the sender network device and the recipient network device, via their corresponding session identifiers. The sender network device may partition the payload and the header (640). The sender network device may generate a digest (or identifier) of the payload by for example applying a hash function to at least a portion of the payload. The sender network device may add the digest of the payload to the header. The sender network device may then select (e.g., establish, identify and/or use) unencrypted and encrypted tunnels (645). The unencrypted tunnel for the payload may not apply a cryptographic algorithm/mechanism/function to the payload, to maintain the single encryption (or already encrypted condition) of the payload. The encrypted tunnel for the header may apply a cryptographic algorithm/mechanism/function to the header.

Referring now to FIG. 6B, depicted is a flow diagram for a method 660 for using tunnels based on a security level of the communications. The functionalities of method 660 may be implemented using, or performed by, the components described in FIGS. 1-5C, such as the appliance 200a-n. In brief overview, a recipient network device (e.g., the appliance 200a or 200b or the recipient network device (570)) may receive a packet (665). The method 660 may be implemented or performed prior to, concurrent with, or subsequent to the method 600 detailed herein above. The recipient network device may determine whether the connection is validated (670). If the connection is not validated, the recipient network device may receive and process the packets from the encrypted tunnel (675). On the other hand, if the connection is validated, the recipient network device may receive the packets from the unencrypted and encrypted tunnels (680). The recipient network device may combine the header with the payload (685).

In further detail, the recipient network device may receive a packet (665). The recipient network device may receive the packet from a communication tunnel as a whole, or the header and payload separately through multiple communication tunnels from the sender network device. The recipient network device may identify through which communication tunnels the packet, header information, and the payload, are received. The recipient network device may determine whether the connection is validated (670). To validate, the recipient network device may parse the header of the packet to identify the connection information. The recipient network device may access a database to search for matching connection information. The presence of the connection information on the database may indicate that the connection is validated (e.g., already established and/or used). If matching connection information is found, the recipient network device may determine that the connection is validated. On the other hand, the lack of the connection information on the database may indicate that the packet is the first packet for a new connection. If no matching connection information is found, the recipient network device may determine that the connection is not validated (e.g., not already established and/or used).

If the connection is not validated, the recipient network device may receive and process the packets from the encrypted tunnel (675). The recipient network device may receive the packet as a whole from the encrypted tunnel. The encrypted tunnel may have applied an encryption algorithm to the entirety of the packet, including the header and the payload. The recipient network device may identify the encryption algorithm/mechanism/function and the encryption level for the encryption. The recipient network device may decrypt the packet using the identified encryption algorithm/mechanism/function and encryption level.

On the other hand, if the connection is validated, the recipient network device may receive the packets from the unencrypted and encrypted tunnels (680). The recipient network device may receive the payload from the unencrypted tunnel and the header from the encrypted tunnel. The encrypted tunnel may have applied an encryption algorithm/mechanism/function to the header. The recipient network device may identify the encryption algorithm/mechanism/function and the encryption level for the encryption. The recipient network device may decrypt the header using the identified encryption algorithm and encryption level.

The recipient network device may combine the header with the payload (685). The recipient network device may parse the decrypted header to identify the digest of the payload added to the header. To associate the header with the corresponding payload, the recipient network device may separately generate a digest of the payload received from the unencrypted tunnel. To generate the digest, the recipient network device may apply a hash function to at least a portion of the payload. With the separately generated digest of the packet, the recipient network device may compare the generated digest with the digest parsed from the header. If the two digests match, the recipient network device may associate the header with the payload, and may also combine the header with the payload to generate a recovered packet.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

It will be further understood that various changes in the details, materials, and arrangements of the parts that have been described and illustrated herein may be made by those skilled in the art without departing from the scope of the following claims.

We claim:

1. A computer-implemented method comprising:
   determining that a level of encryption of a packet meets a threshold, the packet comprising a header and a payload;
   communicating, responsive to the level of encryption meeting the threshold, the payload from the packet to a device via an unencrypted communication tunnel; and
   communicating an identifier of the payload and the header from the packet to the device via an encrypted communication tunnel, thereby causing the device to combine the header received via the encrypted communication tunnel with the payload of the packet received via the unencrypted communication tunnel.

2. The method of claim 1, wherein the encrypted communication tunnel and the unencrypted communication tunnel are established between the device and another device.

3. The method of claim 1, wherein the device is intermediary to a client and a server and the packet is communicated between the client and the server.

4. The method of claim 1, wherein the identifier of the payload comprises a digest of at least a portion of the payload.

5. The method of claim 1, wherein the threshold comprises a type of encryption and encryption level.

6. The method of claim 1, further comprising determining that the level of encryption of the packet meets the threshold in accordance with a communication protocol identified for the packet.

7. The method of claim 1, further comprising determining that the header of the packet identifies an existing connection.

8. A system comprising:
   a device in communication with another device via an encrypted communication tunnel and unencrypted communication tunnel, the first device to:
      determine that a level of encryption of a packet meets a threshold, the packet comprising a header and a payload;
      communicate, responsive to the level of encryption meeting the threshold, the payload from the packet to the another device via the unencrypted communication tunnel; and
      communicate an identifier of the payload and the header from the packet to the another device via an encrypted communication tunnel, the second device to combine the header received via the encrypted communication tunnel with the payload of the packet received via the unencrypted communication tunnel.

9. The system of claim 8, wherein the encrypted communication tunnel and the unencrypted communication tunnel are established between the device and the another device.

10. The system of claim 8, wherein the device and the another device are intermediary to a client and a server and the packet is communicated between the client and the server.

11. The system of claim 8, wherein the identifier of the payload comprises a digest of at least a portion of the payload.

12. The system of claim 8, wherein the threshold comprises a type of encryption and encryption level.

13. The system of claim 8, wherein the device is to determine that the level of encryption of the packet meets the threshold in accordance with a communication protocol identified for the packet.

14. The system of claim 8, wherein the device is to determine that the header of the packet identifies an existing connection.

15. A non-transitory computer readable medium storing program instructions for causing one or more processors of a device to:
   determine that a level of encryption of a packet meets a threshold, the packet comprising a header and a payload;
   communicate, responsive to the level of encryption meeting the threshold, the payload from the packet to another device via an unencrypted communication tunnel; and
   communicate an identifier of the payload and the header from the packet to the another device via an encrypted communication tunnel, the another device to combine the header received via the encrypted communication tunnel with the payload of the packet received via the unencrypted communication tunnel.

16. The non-transitory computer readable medium of claim 15, wherein the identifier of the payload comprises a digest of at least a portion of the payload.

17. The non-transitory computer readable medium of claim 15, wherein the threshold comprises a type of encryption and encryption level.

18. The non-transitory computer readable medium of claim 15, wherein the packet is communicated between a client and server and received by the device.

19. The non-transitory computer readable medium of claim 15, storing program instructions for causing the one or more processors of the device to determine that the level of encryption of the packet meets the threshold in accordance with a communication protocol identified for the packet.

20. The non-transitory computer readable medium of claim 15, storing program instructions for causing the one or more processors of the device to determine that the header of the packet identifies an existing connection.

* * * * *